(12) United States Patent
Kasuya et al.

(10) Patent No.: US 9,677,646 B2
(45) Date of Patent: Jun. 13, 2017

(54) DRIVE DEVICE THAT TRANSFERS ROTATION OF AT LEAST ONE OF A ROTARY ELECTRIC MACHINE AND AN INTERNAL COMBUSTION ENGINE TO AN OIL PUMP

(71) Applicant: AISIN AW CO., LTD., Anjo-shi, Aichi-ken (JP)

(72) Inventors: Satoru Kasuya, Nishio (JP); Masashi Kito, Anjo (JP); Yuichi Seki, Okazaki (JP); Hiroki Shintani, Tokai (JP); Ryosuke Kondo, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/030,517

(22) PCT Filed: Dec. 25, 2014

(86) PCT No.: PCT/JP2014/084385
§ 371 (c)(1),
(2) Date: Apr. 19, 2016

(87) PCT Pub. No.: WO2015/099075
PCT Pub. Date: Jul. 2, 2015

(65) Prior Publication Data
US 2016/0245373 A1    Aug. 25, 2016

(30) Foreign Application Priority Data

Dec. 25, 2013  (JP) ................................ 2013-268129
Jan. 16, 2014  (JP) ................................ 2014-006067
Apr. 25, 2014  (JP) ................................ 2014-092081

(51) Int. Cl.
*B60K 6/383* (2007.10)
*F16H 3/72* (2006.01)
(Continued)

(52) U.S. Cl.
CPC ............... *F16H 3/725* (2013.01); *B60K 6/26* (2013.01); *B60K 6/365* (2013.01); *B60K 6/383* (2013.01);
(Continued)

(58) Field of Classification Search
CPC ..... F16H 3/725; F16H 61/0028; B60K 6/383; B60K 6/40
See application file for complete search history.

(56) References Cited

U.S. PATENT DOCUMENTS 6,746,354 B1     6/2004  Ziemer
2005/0079942 A1  4/2005  Bauknecht et al.
(Continued)

FOREIGN PATENT DOCUMENTS

DE    102010033363 A1    12/2011
DE    102010033364 A1    12/2011
(Continued)

OTHER PUBLICATIONS

Mar. 17, 2015 International Search Report issued in International Patent Application No. PCT/JP2014/084385.

*Primary Examiner* — Huan Le
(74) *Attorney, Agent, or Firm* — Oliff PLC

(57) ABSTRACT

A drive device includes: an oil pump; a first rotation transfer member drivably coupled to the oil pump and driven by at least one of an internal combustion engine and a rotary electric machine; and a second rotation transfer member drivably coupled to wheels and driven by the rotary electric machine. One of the first rotation transfer member and the second rotation transfer member is a pinion. The other rotation transfer member is a carrier that rotatably supports the pinion. The pinion and the carrier are rotated together with each other in the case where the oil pump is driven by the rotary electric machine.

11 Claims, 11 Drawing Sheets

(51) Int. Cl.
  *B60K 6/26*    (2007.10)
  *B60K 6/387*   (2007.10)
  *B60K 6/40*    (2007.10)
  *B60K 6/48*    (2007.10)
  *B60K 6/547*   (2007.10)
  *B60L 11/14*   (2006.01)
  *F16H 61/00*   (2006.01)
  *B60K 6/365*   (2007.10)

(52) U.S. Cl.
  CPC ............... *B60K 6/387* (2013.01); *B60K 6/40* (2013.01); *B60K 6/48* (2013.01); *B60K 6/547* (2013.01); *B60L 11/14* (2013.01); *F16H 61/0028* (2013.01); *B60Y 2200/92* (2013.01); *B60Y 2306/03* (2013.01); *B60Y 2400/427* (2013.01); *B60Y 2400/73* (2013.01); *F16H 2200/006* (2013.01); *F16H 2200/0086* (2013.01); *F16H 2200/2007* (2013.01); *F16H 2200/2046* (2013.01); *Y02T 10/6221* (2013.01); *Y10S 903/91* (2013.01); *Y10S 903/913* (2013.01); *Y10S 903/914* (2013.01); *Y10S 903/919* (2013.01); *Y10S 903/951* (2013.01)

(56) References Cited

U.S. PATENT DOCUMENTS

| | | |
|---|---|---|
| 2007/0007059 A1 | 1/2007 | Nomura et al. |
| 2009/0054190 A1 | 2/2009 | Kim et al. |
| 2013/0116079 A1* | 5/2013 | Wahl .................. F16H 1/36 475/5 |
| 2013/0274047 A1 | 10/2013 | Gotz |
| 2013/0291374 A1 | 11/2013 | Ohnemus et al. |

FOREIGN PATENT DOCUMENTS

| | | |
|---|---|---|
| JP | H06-144020 A | 5/1994 |
| JP | 2007-015441 A | 1/2007 |
| JP | 2009-051484 A | 3/2009 |
| JP | 2009-120195 A | 6/2009 |
| JP | 2013-163462 A | 8/2013 |
| JP | 2013-542377 A | 11/2013 |
| WO | 2012/079697 A1 | 6/2012 |

* cited by examiner

FIG.2

|  | C-1 | C-2 | C-3 | C-4 | B-1 | B-2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev1 |  |  | ○ |  |  | ○ |
| Rev2 |  |  |  | ○ |  | ○ |

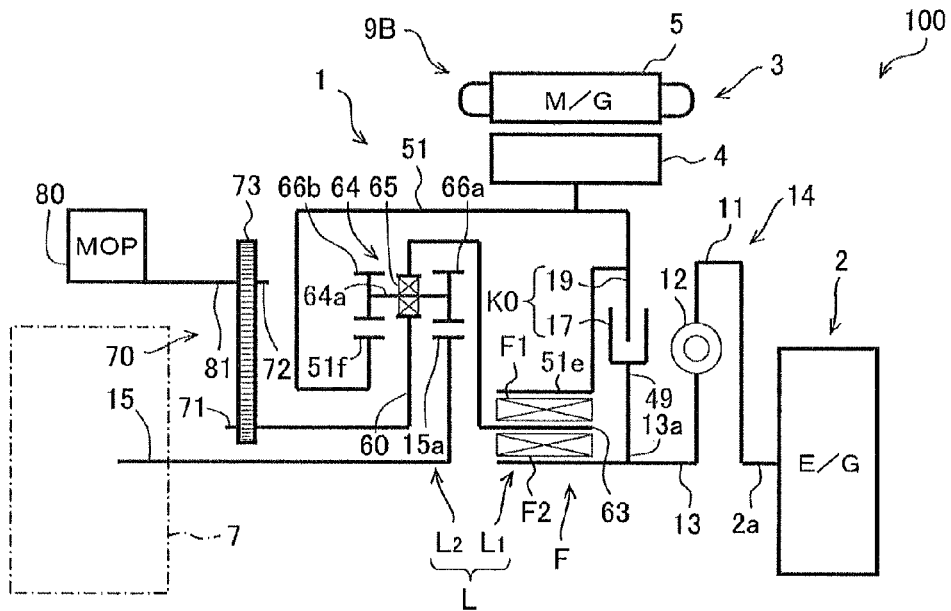
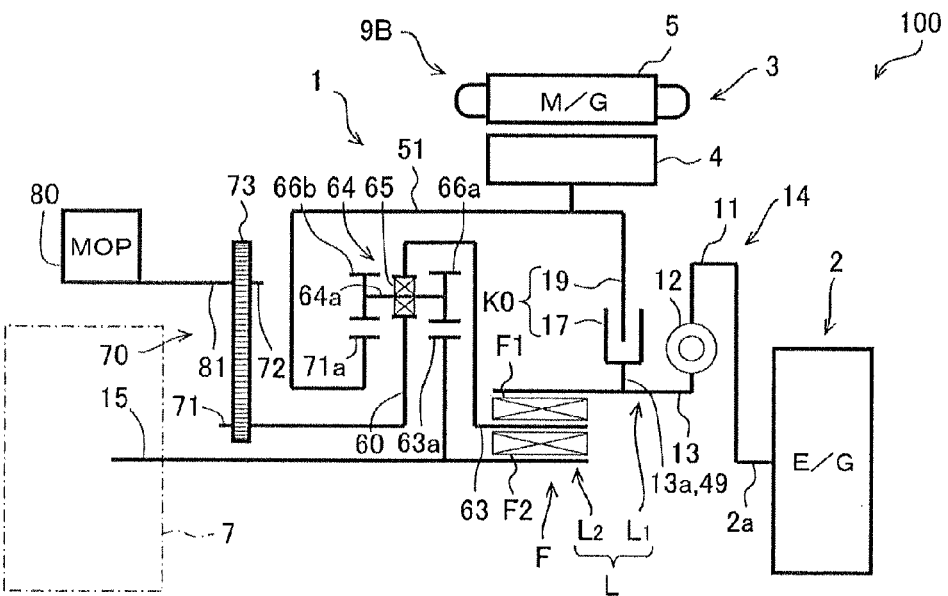

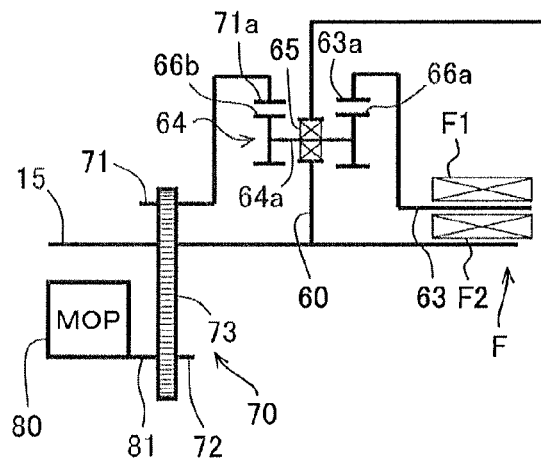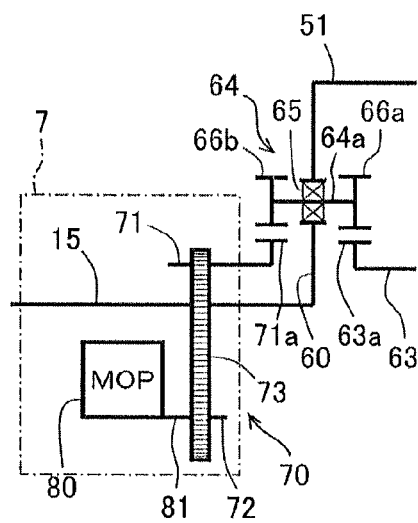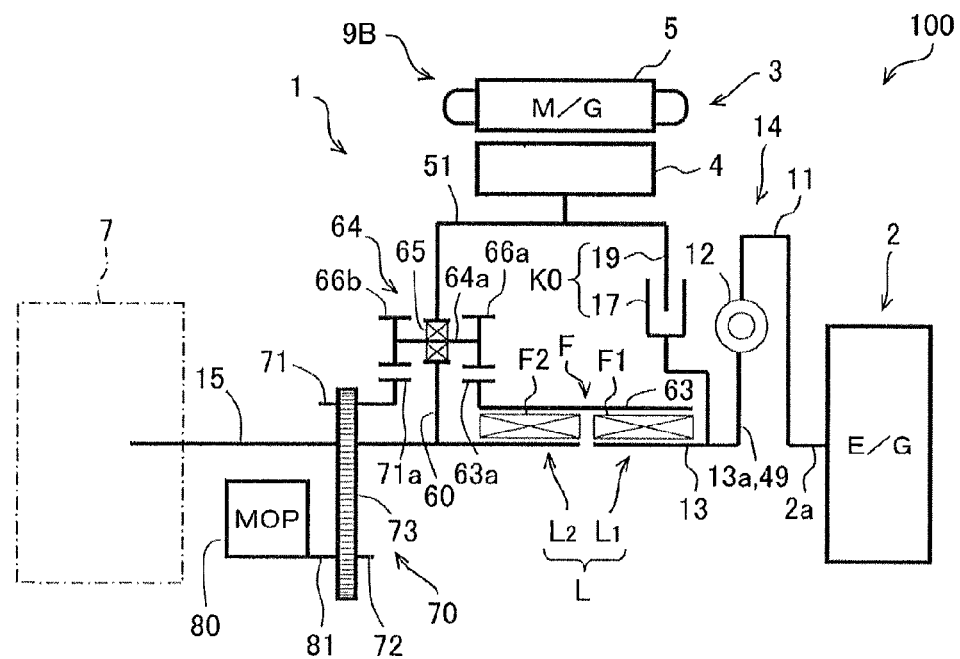

DRIVE DEVICE THAT TRANSFERS ROTATION OF AT LEAST ONE OF A ROTARY ELECTRIC MACHINE AND AN INTERNAL COMBUSTION ENGINE TO AN OIL PUMP

TECHNICAL FIELD

Preferred embodiments of the following disclosure relate to a drive device to be mounted on a vehicle or the like, and in particular relates to a drive device that transfers rotation of at least one of a rotary electric machine and an internal combustion engine to an oil pump.

BACKGROUND ART

In recent years, there has been developed a hybrid vehicle that combines an internal combustion engine and a motor generator (hereinafter referred to simply as "motor") as power sources. As one form of a drive device for use in such a hybrid vehicle, there are proposed drive devices of a parallel type configured by simple replacement, in which a rotary electric machine (motor generator) drivably coupled to an input shaft of a speed change mechanism and an engine connection clutch (starting clutch) that connects and disconnects (engages and disengages) an engine coupling shaft drivably coupled to the internal combustion engine and the input shaft of the speed change mechanism are disposed in a portion for a starting device (such as a torque converter, for example) of a general automatic transmission.

Among such drive devices, there is proposed a drive device configured to include two power transfer paths, namely a power transfer path through which rotation of a motor is transferred to an oil pump and a power transfer path through which rotation of an engine is transferred to the oil pump, in which a one-way clutch is provided in each of the power transfer paths so that rotation of at least one of the motor and the engine is transferred to the oil pump (see Patent Document 1). In the drive device, the power transfer path from the motor to the input shaft of the speed change mechanism couples a clutch drum coupled to a rotor of the motor and splined to outer friction plates of the starting clutch and the input shaft of the speed change mechanism (and also wheels). Therefore, a flange-like carrier and a damper are interposed between the clutch drum and the input shaft so that the rotor and the input shaft are rotatable together with each other. Consequently, it is necessary for the power transfer path from the engine to the oil pump to extend across the power transfer path from the motor to the input shaft. Thus, a stepped planetary gear, which is a part of the power transfer path from the engine to the oil pump, is rotatably provided to penetrate the carrier.

RELATED-ART DOCUMENTS

Patent Documents

[Patent Document 1] DE 10 2010 033 364 A1

SUMMARY

In the configuration in which the stepped planetary gear is rotatably supported by the carrier discussed above, a bearing is normally interposed between the carrier and the stepped planetary gear. The durability required for the bearing is determined by a dynamic load which acts on the bearing. Therefore, the durability required for the bearing can be reduced if the dynamic load which acts on the bearing can be reduced. By reducing the durability required for the bearing, it is possible to make the bearing itself smaller and reduce the number of stepped planetary gears, and to achieve a reduction in size, weight, and cost of the drive device. Thus, it is desired to reduce the dynamic load which acts on the bearing.

It is therefore an object to provide a drive device in which a dynamic load can be reduced by reducing an accumulated number of revolutions of relative rotation between a pinion and a carrier in the case where a power transfer path from a rotary electric machine or an internal combustion engine to an oil pump intersects a power transfer path from a rotary electric machine to wheels via the pinion and the carrier.

Means for Solving the Problem

The present drive device (see FIGS. 1 to 11, for example) is a drive device that has a rotary electric machine drivably coupled to wheels, the drive device including:

an oil pump;
a first rotation transfer member drivably coupled to the oil pump and driven by at least one of an internal combustion engine and the rotary electric machine; and
a second rotation transfer member drivably coupled to the wheels and driven by the rotary electric machine, wherein
one of the first rotation transfer member and the second rotation transfer member is a pinion, and the other rotation transfer member is a carrier that rotatably supports the pinion; and
the pinion and the carrier are rotated together with each other in the case where the oil pump is driven by the rotary electric machine.

Consequently, in the case where the oil pump is driven by the rotary electric machine, rotation from the rotary electric machine is transferred to both the pinion and the carrier. Therefore, a difference in rotation (relative rotation) is not caused between the pinion and the carrier, and the pinion and the carrier are rotated together with each other. Hence, the accumulated number of revolutions at a location at which power transfer paths intersect each other via the pinion and the carrier can be decreased for an amount corresponding to the absence of rotation of the pinion relative to the carrier compared to the technology in which a stepped planetary gear (pinion) is rotated relative to the carrier for an amount corresponding to a difference in rotation between the rotary electric machine and the internal combustion engine with rotation of the internal combustion engine transferred to the stepped planetary gear and with rotation of the rotary electric machine transferred to the carrier in the case where the oil pump is driven by the rotary electric machine as in the related art. Therefore, it is possible to reduce the dynamic load due to relative rotation between the pinion and the carrier.

The numerals in the above parentheses are provided for reference to the drawings. Such numerals are provided for convenience to facilitate understanding, and should not be construed as affecting the scope of the claims in any way.

BRIEF DESCRIPTION OF THE DRAWINGS

FIG. 2 is an engagement table of shift speeds of an automatic transmission.

FIG. 10 is a schematic diagram illustrating a hybrid vehicle, in which FIG. 10A corresponds to a tenth embodiment and FIG. 10B corresponds to an eleventh embodiment.

FIG. 11 is a schematic diagram illustrating a hybrid vehicle, in which FIG. 11A corresponds to a case where a ring gear that circumscribes a pinion is applied, FIG. 11B corresponds to a case where an oil pump and a rotation transfer mechanism for the oil pump are provided in a speed change mechanism, and FIG. 11C corresponds to a case where a first one-way clutch and a second one-way clutch are disposed side by side in the axial direction.

DESCRIPTION

<First Embodiment>

Figure 3:
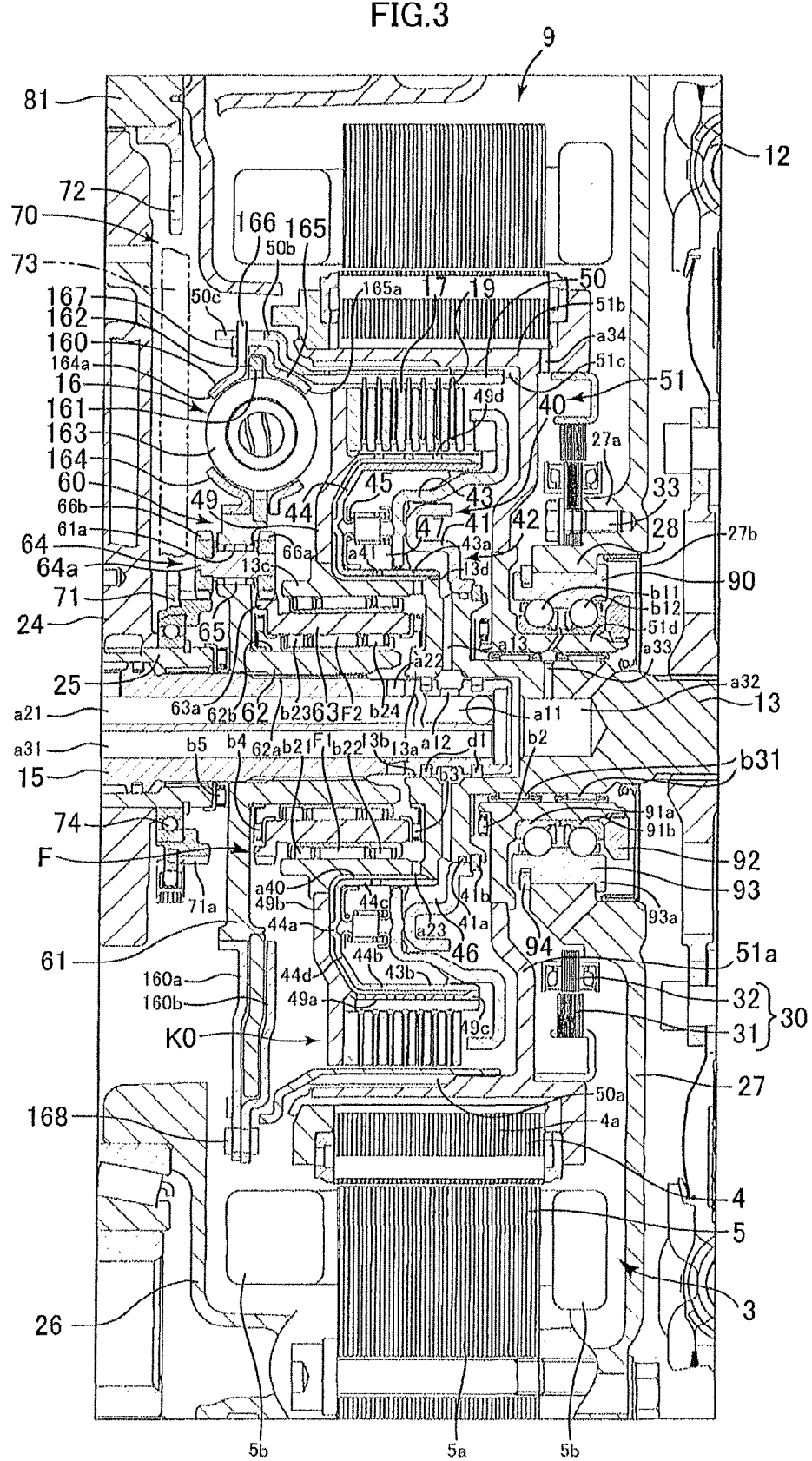
FIG. 3 is a sectional view illustrating an input portion 9 according to the first embodiment.

A drive device 1 of a hybrid type according to a first embodiment will be described below with reference to FIGS. 1 to 3. The drive device according to the embodiment is suitably mounted on front-engine front-drive (FF) vehicles, for example. The left-right direction in FIGS. 1 and 3 corresponds to the left-right direction (or the direction opposite to the left-right direction) with the drive device actually mounted on a vehicle. For convenience of description, however, the right side of the drawings on which a drive source such as an engine is provided is referred to as "front side", and the left side of the drawings is referred to as "rear side".

In addition, the term "drivably coupled" refers to a state in which rotary elements are coupled to each other in such a way that allows transfer of a drive force, which includes a state in which the rotary elements are coupled to each other to rotate together with each other, and a state in which the rotary elements are coupled to each other via a clutch or the like in such a way that allows transfer of a drive force. In the embodiment, in addition, the speed change mechanism is an 8-speed automatic transmission. As a matter of course, however, the present embodiment is not limited thereto. In FIG. 1, the automatic transmission is illustrated in a skeleton diagram.

Figure 1:
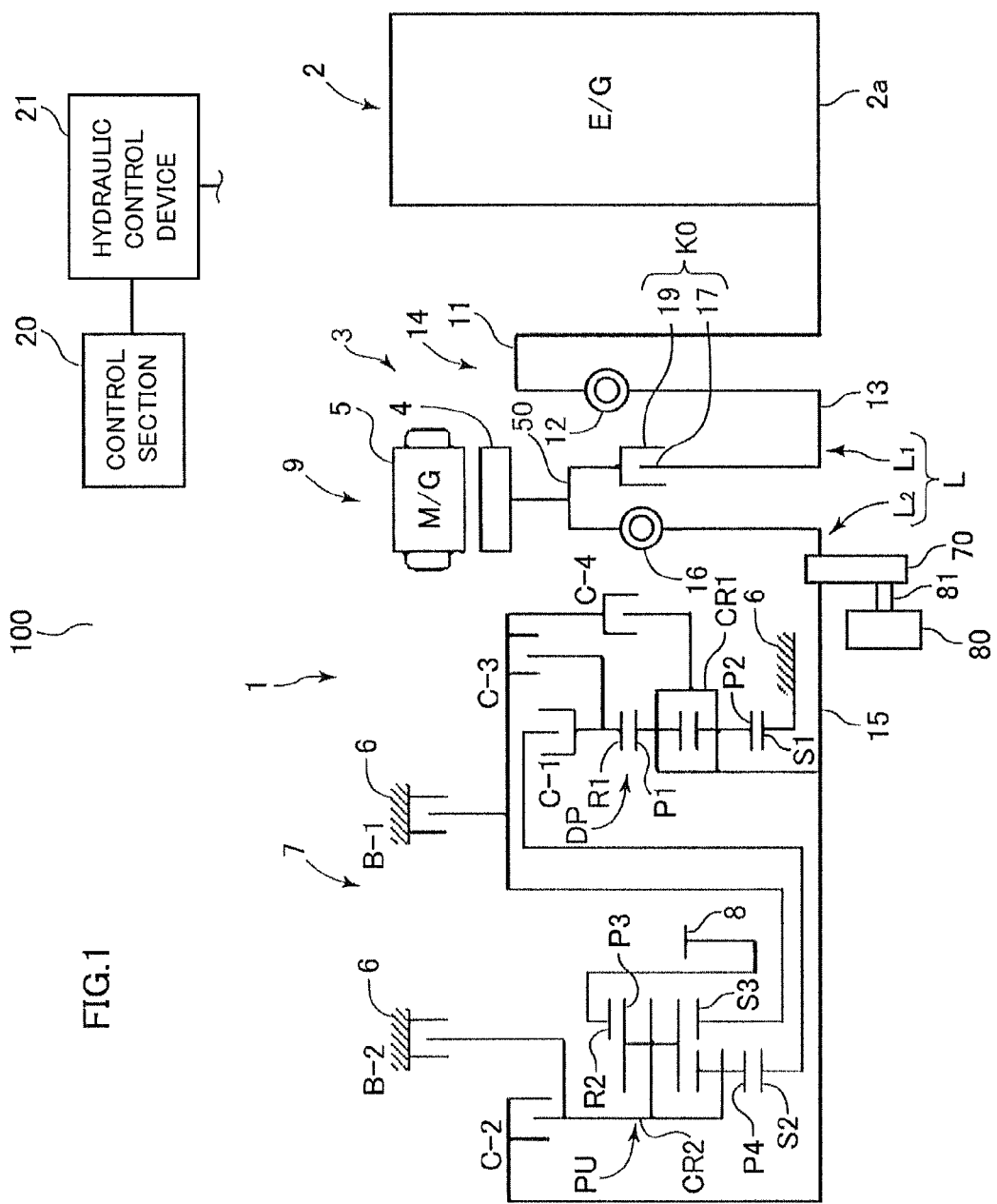
FIG. 1 is a schematic diagram illustrating a hybrid vehicle according to a first embodiment.

As illustrated in FIG. 1, a hybrid vehicle (hereinafter referred to simply as "vehicle") 100 includes an internal combustion engine 2 and also a rotary electric machine (motor generator) 3 as drive sources. The drive device 1 which constitutes a power train of the vehicle 100 is configured to have: a speed change mechanism 7 provided on a power transfer path L between the internal combustion engine 2 and wheels; an input portion 9 which is disposed between the speed change mechanism 7 and the internal combustion engine 2 and to which power from the internal combustion engine 2 is input; and a connection portion 14 that connects between the input portion 9 and the internal combustion engine 2 while absorbing pulsations of the internal combustion engine 2. The internal combustion engine 2, the input portion 9, and the speed change mechanism 7 are disposed coaxially in this order in the axial direction. That is, the motor generator 3, a carrier 60, and pinions 64 to be discussed later are disposed in a region between the internal combustion engine 2 and the speed change mechanism 7.

The connection portion 14 includes a damper 12 connected via a drive plate 11 to a crankshaft 2a of the internal combustion engine 2 which is drivably coupled to wheels. The damper 12 is connected to an engine coupling shaft 13 that also serves as an input member as the input portion 9. That is, the engine coupling shaft 13 is drivably coupled to the internal combustion engine 2 via the damper 12. In addition, the drive device 1 includes the engine coupling shaft 13 which serves as an input member drivably coupled to the internal combustion engine 2.

The input portion 9 is configured to include: a clutch (engine connection clutch) K0 that enables and disables power transfer between (engages and disengages) the engine coupling shaft 13 and an input shaft 15 of the speed change mechanism 7; and the motor generator (rotary electric machine) 3 and a damper 16 drivably coupled to a clutch drum 50. The motor generator (hereinafter referred to simply as "motor") 3 is configured to have a rotor 4 coupled to the clutch drum 50 and a stator 5 disposed on the radially outer side of the rotor 4 so as to oppose the rotor 4, and disposed coaxially with the engine coupling shaft 13.

In addition, the clutch K0 is constituted as a multi-plate clutch in which inner friction plates 17 and outer friction plates 19, which are a plurality of friction plates, are housed in the internal space of the clutch drum 50. The clutch drum 50 is drivably coupled to the input shaft 15 of the speed change mechanism 7 via the damper 16. That is, the clutch K0 has the inner friction plates 17 which are drivably coupled to a transfer path $L_1$ on the internal combustion engine side of the transfer path L, and the outer friction plates 19 which are drivably coupled to a transfer path $L_2$ on the wheels side. The clutch drum 50 is also drivably coupled to the transfer path $L_2$ on the wheels side. Thus, the clutch K0 can drivably couple and decouple the internal combustion engine 2 and the speed change mechanism 7 to and from each other. In the case of the embodiment, the damper 16 is provided between the motor 3 and the speed change mechanism 7 in addition to the damper 12 which is provided between the internal combustion engine 2 and the input portion 9. Vibration of the internal combustion engine 2 is absorbed by the two dampers 12 and 16.

The speed change mechanism 7 includes the input shaft 15 which serves as an output member drivably coupled to the wheels. That is, the drive device 1 includes the input shaft 15 which serves as an output member drivably coupled to the wheels. The speed change mechanism 7 includes a planetary gear (speed reduction planetary gear) DP and a speed change planetary gear unit (planetary gear set) PU provided on the input shaft 15. The planetary gear DP is a so-called double-pinion planetary gear, which includes a first sun gear S1, a first carrier CR1, and a first ring gear R1 and in which the first carrier CR1 has pinions P2 meshed with the first sun gear S1 and pinions P1 meshed with the first ring gear R1 in such a manner that the pinions P2 and the pinions P1 are meshed with each other.

Meanwhile, the planetary gear unit PU is a so-called Ravigneaux type planetary gear, which has four rotary elements, namely a second sun gear S2, a third sun gear S3, a second carrier CR2, and a second ring gear R2, and in which the second carrier CR2 has long pinions P3 meshed with the third sun gear S3 and the second ring gear R2 and short pinions P4 meshed with the second sun gear S2 in such a manner that the long pinions P3 and the short pinions P4 are meshed with each other.

The first sun gear S1 of the planetary gear DP is stationary in terms of rotation with respect to a case 6. In addition, the first carrier CR1 is connected to the input shaft 15 so as to make the same rotation (hereinafter referred to as "input rotation") as rotation of the input shaft 15, and connected to a fourth clutch C-4. Further, the first ring gear R1 rotates at a speed reduced compared to the speed of the input rotation by the first sun gear S1 which is stationary and the first carrier CR1 which performs the input rotation, and is connected to a first clutch C-1 and a third clutch C-3.

The third sun gear S3 of the planetary gear unit PU is connected to a first brake B-1 so as to be capable of being stationary with respect to the case 6, and also connected to the fourth clutch C-4 and the third clutch C-3 so as to be capable of receiving the input rotation of the first carrier CR1 via the fourth clutch C-4 and the reduced-speed rotation of the first ring gear R1 via the third clutch C-3. In addition, the second sun gear S2 is connected to the first clutch C-1 so as to be capable of receiving the reduced-speed rotation of the first ring gear R1.

Further, the second carrier CR2 is connected to a second clutch C-2 to which rotation of the input shaft 15 is input so as to be capable of receiving the input rotation via the second clutch C-2. The second carrier CR2 is also connected to a second brake B-2 so as to be capable of being stationary in terms of rotation via the second brake B-2. The second ring gear R2 is connected to a counter gear 8 supported so as to be rotatable with respect to a center support member fixed to the case 6. The counter gear 8 is connected to the left and right wheels via a differential gear etc.

In the speed change mechanism 7 configured as described above, the first to fourth clutches C-1 to C-4 and the first and second brakes B-1 and B-2 illustrated in the skeleton diagram of FIG. 1 are engaged and disengaged in combinations indicated in the engagement table of FIG. 2 to establish one of a first forward speed (1st) to an eighth forward speed (8th) and a first reverse speed (Rev1) to a second reverse speed (Rev2).

In addition, the plurality of friction engagement elements such as the clutches C-1 to C-4 and the brakes B-1 and B-2 which are provided inside the speed change mechanism 7 are controlled so as to be engaged and disengaged in this way in accordance with an engagement pressure supplied from a hydraulic control device 21 driven through electronic control performed by a control section (ECU) 20. The clutch K0 is also controlled so as to be engaged and disengaged in accordance with an engagement pressure supplied from the hydraulic control device 21. The hydraulic control device 21 also generates a lubrication pressure for supplying lubricating oil for lubricating various portions, and lubricates and cools the inside of the speed change mechanism 7 and the inside of the input portion 9, in particular the inner friction plates 17 and the outer friction plates 19 of the clutch K0 and the motor 3.

The speed change mechanism 7 may be a stepped speed change mechanism that establishes the third to seventh forward speeds, for example, and may be a continuously variable speed change mechanism such as a continuously variable transmission of a belt type, a continuously variable transmission of a toroidal type, and a continuously variable transmission of a cone ring type. That is, any speed change mechanism may be applied to the drive device 1 according to the embodiment.

In the drive device 1, as described above, the connection portion 14, the input portion 9 which has the clutch K0 and the motor 3, and the speed change mechanism 7 are disposed sequentially from the internal combustion engine 2 side to the wheels side. In the case where the vehicle is caused to travel by driving both the internal combustion engine 2 and the motor 3, the control section 20 controls the hydraulic control device 21 so as to engage the clutch K0. During EV travel in which the vehicle travels using only the drive force of the motor 3 which is drivably coupled to the transfer path $L_2$ on the wheels side, the clutch K0 is disengaged to disconnect the transfer path $L_1$ on the internal combustion engine 2 side and the transfer path $L_2$ on the wheels side from each other.

Next, the configuration of the input portion 9 will be described in detail with reference to FIG. 3. The clutch K0, the motor 3, and further the damper 16 to be discussed later are housed inside a housing case 26 fixed to a transmission case (not illustrated) that houses the speed change mechanism 7. The internal space of the housing case 26 which houses the clutch K0 and the motor 3 is closed by a partition wall (case wall) 27 integrally attached to the housing case 26 on the internal combustion engine 2 side (one side), in the axial direction, with respect to the motor 3 and the clutch K0 to constitute a closed space separated from the connection portion 14. The transmission case, the housing case 26, and the partition wall 27 constitute the case 6 discussed above.

On the center side of the housing case 26, the engine coupling shaft 13 which is connected to the internal combustion engine 2 via the damper 12 of the connection portion 14 and the input shaft 15 of the speed change mechanism 7 are disposed coaxially with each other. The engine coupling shaft 13 is formed with a recessed portion 13b which is provided at an end portion on the side opposite to the internal combustion engine 2 and the center portion of which is recessed toward the internal combustion engine 2. The distal end of the input shaft 15 on the internal combustion engine 2 side is inserted into the recessed portion 13b. That is, the engine coupling shaft 13 and the input shaft 15 constitute a single shaft shape in which the distal end of the input shaft 15 is fitted in the recessed portion 13b so that the engine coupling shaft 13 and the input shaft 15 are rotatable relative to each other. A seal ring (seal member) d1 embedded in the outer peripheral surface of the input shaft 15 to extend in the circumferential direction seals a space between the outer peripheral surface of the input shaft 15 and the recessed portion 13b of the engine coupling shaft 13. The oil passage structure will be discussed in detail later.

The engine coupling shaft 13 is rotatably supported by an angular ball bearing 90, a tubular portion 51d of a rotor hub 51, and a needle bearing b31 with respect to the partition wall 27. The structure for supporting the rotor hub 51 with respect to the partition wall 27 will be discussed in detail later. Meanwhile, the input shaft 15 is rotatably supported with respect to a sleeve member 25 disposed on the inner peripheral side of a partition wall 24 fixed to the transmission case (not illustrated).

A flange portion 13a and a sleeve portion 13c, which are engine rotation transfer members, are integrally formed at the rear end portion of the engine coupling shaft 13 which is on the speed change mechanism 7 side. A clutch hub 49, to which the plurality of inner friction plates 17 of the clutch K0 are splined, is secured to the outer peripheral surface of the flange portion 13a and the sleeve portion 13c, and a hydraulic servo 40 to be discussed later is disposed on the outer peripheral surface of the flange portion 13a and the sleeve portion 13c. That is, the inner friction plates 17 are drivably coupled to the engine coupling shaft 13.

The clutch K0 is configured to roughly have: the plurality of inner friction plates 17; the outer friction plates 19 which are disposed alternately with the inner friction plates 17; the clutch drum 50 to which the outer friction plates 19 are splined; the clutch hub 49 which is a support member that supports the plurality of inner friction plates 17; and the hydraulic servo 40 which connects and disconnects (engages and disengages) the inner friction plates 17 and the outer friction plates 19. At least some of the outer friction plates 19 and the inner friction plates 17, which are a plurality of friction plates, are positioned so as to overlap the rotor 4 of the motor 3 as seen from the radial direction. In the embodiment, the entirety of the outer friction plates 19 and the inner friction plates 17 is disposed on the radially inner side of the rotor 4 of the motor 3 so as to overlap the rotor 4 as seen from the radial direction. In addition, the clutch K0 is disposed such that the partition wall 27, the rotor hub 51, at least some of the outer friction plates 19 and the inner friction plates 17, and the damper 16 are arranged in this order in the axial direction.

The clutch drum 50 is connected to the rotor hub 51, which holds the rotor 4, so as to enable rotation transfer, and connected to the damper 16 to be discussed later so as to enable rotation transfer. That is, a spline portion 50a is formed on the outer peripheral surface of the clutch drum 50. The spline portion 50a is splined to a spline portion 51c formed on the inner peripheral surface of a drum-shaped interposing portion (rotor holding portion) 51b of the rotor hub 51 to be discussed later. The rotor hub 51 and the clutch drum 50 are connected to each other through the spline portions so as to enable rotation transfer. The connection portion between the clutch drum 50 and the damper 16 will be discussed later. The damper 16 is connected to the input shaft 15 of the speed change mechanism 7 so as to enable rotation transfer as discussed later. Thus, the damper 16 is disposed on a member that couples the rotor 4 and the speed change mechanism 7 to each other. In addition, the plurality of outer friction plates 19 are splined to the inner side of the clutch drum 50. Thus, the outer friction plates 19 are drivably coupled to the input shaft 15 via the clutch drum 50 and the damper 16.

The clutch hub 49 has a drum-shaped drum portion 49a to which the plurality of inner friction plates 17 are splined, and an extending portion 49b that extends radially inward from an end portion of the drum portion 49a. The inner peripheral surface of the extending portion 49b is fixed to the outer peripheral surface of the sleeve portion 13c by welding or the like.

The hydraulic servo 40 has: a cylinder portion 41 that constitutes a hydraulic cylinder 42; a piston 43 which is disposed so as to be movable in the axial direction with respect to the hydraulic cylinder 42 and the distal end portion of which is disposed so as to oppose the inner friction plates 17 (or the outer friction plates 19); a return portion 44 positioned in the axial direction with respect to the hydraulic cylinder 42; and a return spring 45 disposed between the piston 43 and the return portion 44. The hydraulic cylinder 42 is composed of the cylinder portion 41 and a distal end-side portion of an inner cylindrical portion 44c that constitutes the return portion 44 to be discussed later. The cylinder portion 41 is externally fitted on the outer peripheral surface of the flange portion 13a of the engine coupling shaft 13 via a seal ring 41a, and positioned in the axial direction with respect to the flange portion 13a by a snap ring 41b. Meanwhile, the return portion 44 is positioned in the axial direction with respect to the clutch hub 49 with projecting portions 44a of a coupling portion 44d to be discussed later, which are formed at a plurality of locations in the circumferential direction, abutting against a side surface of the clutch hub 49 which is secured to the sleeve portion 13c of the engine coupling shaft 13. Thus, the cylinder portion 41 and the return portion 44 are positioned in the axial direction with respect to each other via the flange portion 13a, the sleeve portion 13c, and the clutch hub 49.

In addition, the return portion 44 is composed of an outer cylindrical portion 44b, the inner cylindrical portion 44c, and the coupling portion 44d which couples respective first end portions of the outer cylindrical portion 44b and the inner cylindrical portion 44c to each other, and disposed between the clutch hub 49 and the sleeve portion 13c so as to open on the piston 43 side. The return portion 44 is disposed with the plurality of projecting portions 44a, which are formed on the coupling portion 44d, abutting against the extending portion 49b of the clutch hub 49 and with the return spring 45 elastically compressed between the coupling portion 44d and the piston 43. Thus, the coupling portion 44d corresponds to a return plate. In addition, a clearance is formed between the coupling portion 44d and the extending portion 49b of the clutch hub 49 by causing the plurality of projecting portions 44a to abut against the clutch hub 49.

In addition, the inner cylindrical portion 44c is disposed with a clearance from the outer peripheral surface of the sleeve portion 13c. To this end, projecting portions 13d are formed on the outer peripheral surface of an end portion of the sleeve portion 13c on the flange portion 13a side and the distal end portion of the inner cylindrical portion 44c is externally fitted with the projecting portions 13d to form a clearance between the inner peripheral surface of the inner cylindrical portion 44c and the outer peripheral surface of the sleeve portion 13c excluding the projecting portions 13d and opposing the inner peripheral surface of the inner cylindrical portion 44c. In addition, the outer peripheral surface of the inner cylindrical portion 44c serves as a sliding portion 43a over which the piston 43 slides, and the inner peripheral surface of the outer cylindrical portion 44b also serves as a sliding portion 43b over which the piston 43 slides. The piston 43 slides over the sliding portions 43a and 43b via a seal ring. Consequently, a hydraulic oil chamber 46 is formed between the hydraulic cylinder 42, which is composed of the cylinder portion 41 and the distal end-side portion of the inner cylindrical portion 44c, and the piston 43, and a cancellation oil chamber 47 for canceling a centrifugal hydraulic pressure is formed between the return portion 44, which is composed of the outer cylindrical portion 44b, the inner cylindrical portion 44c, and the coupling portion 44d, and the piston 43.

In addition, the outer cylindrical portion 44b is disposed with a clearance from the inner peripheral surface of the drum portion 49a of the clutch hub 49. To this end, projecting portions 49c are formed on the inner peripheral surface of the distal end portion of the drum portion 49a and the distal end portion of the outer cylindrical portion 44b is internally fitted with the projecting portions 49c to form a clearance between the inner peripheral surface of the outer cylindrical portion 44b and the inner peripheral surface of the drum portion 49a excluding the projecting portions 49c and opposing the inner peripheral surface of the outer cylindrical portion 44b. As a result, the clearance between the inner cylindrical portion 44c and the sleeve portion 13c, the clearance between the coupling portion 44d and the extending portion 49b, and the clearance between the outer cylindrical portion 44b and the drum portion 49a communicate with each other to form an oil passage a40, through which lubricating oil is supplied to the plurality of inner friction plates 17 and outer friction plates 19, between the return portion 44 and the hydraulic cylinder 42 and the clutch hub 49.

Meanwhile, the annular stator 5 of the motor 3 is fixed on the outer peripheral side of the clutch K0 and on the inner peripheral side of the housing case 26. The stator 5 is configured to have a stator core 5a and coil ends 5b and 5b that are turn-back portions of a coil wound around the stator core 5a and that project to both sides of the stator core 5a in the axial direction. The annular rotor 4 of the motor 3 is disposed on the inner peripheral side of the stator core 5a so as to oppose the stator core 5a via a predetermined clearance.

The rotor hub 51 which holds the rotor 4 is configured to have: the drum-shaped interposing portion (rotor holding portion) 51b on which a rotor core 4a of the rotor 4 is held by caulking; a flange-like support portion 51a that supports the interposing portion 51b; and the sleeve-like tubular portion 51d which is connected to the inner peripheral side of the support portion 51a. The interposing portion 51b and the support portion 51a are integral with each other and the support portion 51a and the tubular portion 51d are welded to each other to constitute the rotor hub 51 which is integral as a whole.

The tubular portion 51d is supported by the angular ball bearing (rotor bearing) 90 so as to be rotatable with respect to the partition wall 27 which is integrally attached to the housing case 26, and also supported in the axial direction by a thrust bearing b2 provided between the flange portion 13a of the engine coupling shaft 13 and the tubular portion 51d. A thrust bearing b3 is provided between the flange portion 13a of the engine coupling shaft 13 and a coupling member 63 to be discussed later, a thrust bearing b4 is provided between the coupling member 63 and a carrier (second rotation transfer member, damper coupling portion) 60 that couples the damper 16 to be discussed later and the input shaft 15 to each other, and a thrust bearing b5 is provided between the carrier 60 and the sleeve member 25, so that the respective members are positioned in the axial direction.

The angular ball bearing 90 is composed of two ball bearings b11 and b12 fitted on the outer peripheral side of the tubular portion 51d. Respective inner races 91a and 91b of the ball bearings b11 and b12 are fastened to the rotor hub 51 by being held between a nut (fastening member) 92, which is screwed to male threads on the outer peripheral side of the tubular portion 51d from the internal combustion engine 2 side to the speed change mechanism 7 side in the axial direction, and the inner surface of the support portion 51a of the rotor hub 51. In addition, an outer race 93 of the ball bearings b11 and b12 is fixed to the partition wall 27 by interposing a support member 28 of the partition wall 27 between a projecting portion 93a, which is provided on the internal combustion engine 2 side in the axial direction, and a snap ring 94. In this way, the rotor hub 51 and the rotor 4 are supported so as to be rotatable with respect to the partition wall 27 with the angular ball bearing 90 fastened by the nut 92.

The support member 28 which supports the angular ball bearing 90 is disposed so as to cover the outer peripheral side of the angular ball bearing 90. On the outer peripheral side of the support member 28, a stationary element (detection coil) 32 is fixed to a cylindrical seat portion 27a, which is provided to project from the partition wall 27, by a bolt 33 so as to oppose a rotary element 31. The rotary element 31 is secured to the inner peripheral side of the rotor hub 51 which supports the rotor 4 of the motor 3. Thus, the rotary element 31 and the stationary element 32 constitute a resolver 30 that detects the rotational state of the motor 3.

Meanwhile, the clutch drum 50, which is connected to the rotor hub 51 so as to enable rotation transfer, has the spline portion 50a which is formed on at least a part of the outer peripheral surface in the axial direction and which is splined to the rotor hub 51 as discussed earlier, and folded portions 50b provided at first portions in the circumferential direction on the damper 16 side and folded such that end portions are positioned on the radially outer side with respect to the spline portion 50a. Comb teeth-shaped clutch-side engagement portions 50c are formed at first portions of the distal end portion of the folded portions 50b in the circumferential direction.

The damper 16 is disposed on the radially inner side with respect to the stator 5 such that at least a part of the damper 16 overlaps the coil end 5b of the stator 5 as seen from the radial direction of the motor 3. In addition, the damper 16 is disposed such that the partition wall 27, the rotor hub 51, the outer friction plates 19 and the inner friction plates 17 of the clutch K0, and at least some of springs 163 to be discussed next are arranged in this order in the axial direction. Such a damper 16 has: an annular damper shell 160; a disk-like driven plate 162 disposed in the damper shell 160 and having a plurality of openings 161 in the circumferential direction; and a plurality of springs 163 respectively disposed in the plurality of openings 161 to transfer rotation input from the damper shell 160 to the driven plate 162. The damper shell 160 has a pair of shell members 160a and 160b disposed so as to interpose the driven plate 162. The shell members 160a and 160b have notches 164a and 165a, respectively, at positions corresponding to the openings 161 of the driven plate 162, and are provided with holding portions 164 and 165, respectively, formed to be bulged in the axial direction. The springs 163 are disposed in the notches 164a and 165a to hold the respective springs 163 between the holding portions 164 and 165.

In addition, comb teeth-shaped damper-side engagement portions 166 are formed at the outer peripheral edge portion of first portions, in the circumferential direction, of at least one (in the illustrated example, the shell member 160a on the speed change mechanism 7 side) of the pair of shell members 160a and 160b. The damper-side engagement portions 166 can engage the clutch-side engagement portions 50c to transfer rotation of the clutch drum 50. When the damper-side engagement portions 166 engage the clutch-side engagement portions 50c, the damper-side engagement portions 166 are prevented from slipping off in the axial direction from the clutch-side engagement portions 50c by a snap ring 167. In addition, the folded portions 50b of the clutch drum 50 are folded along the holding portion 165 of the shell member 160b of the damper shell 160 on the internal combustion engine 2 side.

Further, the pair of shell members 160a and 160b are joined to each other by rivets 168 at second portions in the circumferential direction, that is, at positions in the circumferential direction at which the damper-side engagement portions 166 are not formed, on the radially outer side with respect to the damper-side engagement portions 166. In other words, the clutch drum 50 and the damper 16 transfer rotation on the radially inner side of the rivets 168 which couple the pair of shell members 160a and 160b to each other. In addition, in order to enable such rotation transfer, rotation is transferred between the clutch-side engagement portions 50c and the damper-side engagement portions 166 which are formed in a comb teeth shape. In the damper 16 thus configured, rotation is input from the clutch drum 50 to the damper shell 160, and transferred to the driven plate 162 via the plurality of springs 163. Therefore, rotation transferred from the clutch drum 50 is output from the driven plate 162 with vibration reduced by the springs 163.

In addition, the damper 16 is connected to the input shaft 15 by the carrier 60 so as to enable rotation transfer. The carrier 60 has a disk-like circular plate portion (damper support portion) 61 that supports the damper 16 on the radially inner side of the damper 16, and a cylindrical sleeve portion 62 formed integrally with the circular plate portion 61 to extend in the axial direction from the inner peripheral edge portion of the circular plate portion 61. The damper 16 is externally fitted on the outer peripheral surface of the circular plate portion 61, and the inner peripheral surface of the driven plate 162 is fixed to the circular plate portion 61 by welding or the like. In the embodiment, the damper 16 is disposed with the center position of the damper 16 in the axial direction offset to the side of the coupling member 63 to be discussed later with respect to the center position of the circular plate portion 61 in the axial direction.

Meanwhile, the sleeve portion 62 is splined to the input shaft 15. Consequently, rotation output from the driven plate 162 of the damper 16 is transferred to the input shaft 15 via the carrier 60. Thus, the rotor 4 of the motor 3 is drivably coupled to the input shaft 15 of the speed change mechanism 7 via the rotor hub 51, the clutch drum 50, the damper 16, and the carrier 60. That is, the carrier 60 is disposed in a power transfer path from the motor 3 to the wheels. In addition, the internal combustion engine 2 is drivably coupled to the input shaft 15 via the engine coupling shaft 13, the clutch K0, the damper 16, and the carrier 60.

In addition, a one-way clutch portion (rotation selection portion) F is disposed on the outer peripheral side of the input shaft 15 as interposed between the sleeve portion 13c of the engine coupling shaft 13 and the sleeve portion 62 of the carrier 60. Rotation of one of the motor 3 and the internal combustion engine 2, the rotational speed of which is higher (not lower) than the other, is output from the coupling member (tubular member) 63 which serves as an output member of the one-way clutch portion F. One-way clutches F1 and F2, which constitute the one-way clutch portion F, and the coupling member 63 are disposed on the clutch K0 side with respect to the circular plate portion 61. In addition, the coupling member 63 is drivably coupled to an oil pump 80 as discussed later.

A specific description follows. The first one-way clutch F1 and needle bearings b21 and b22 are disposed between the sleeve portion 13c, which is an engine-side cylindrical portion of the engine rotation transfer member, and the coupling member 63 with the needle bearings b21 and b22 provided at both ends of the first one-way clutch F1. Further, the second one-way clutch F2 and needle bearings b23 and b24 are disposed between the sleeve portion 62, which is a rotor-side cylindrical portion of a rotor rotation transfer member, and the coupling member 63 so as to overlap at least a part of the first one-way clutch F1 as seen from the radial direction (in the embodiment, at generally the same position in the axial direction) with the needle bearings b23 and b24 provided at both ends of the second one-way clutch F2. A spline portion 62a splined to the input shaft 15 of the speed change mechanism 7 is formed on the inner peripheral surface of the sleeve portion 62. A cylindrical surface 62b that contacts the inner race of the second one-way clutch F2 is formed on the outer peripheral surface of the sleeve portion 62. The sleeve portion 62 has a certain axial dimension in order to form the spline portion 62a. Therefore, the second one-way clutch F2 can be disposed efficiently on the outer peripheral surface of the sleeve portion 62 utilizing the axial dimension.

The sleeve portion 13c, which is always drivably coupled to the internal combustion engine 2, is disposed on the outer peripheral side of the first one-way clutch F1. The input shaft 15, which is always drivably coupled to the motor 3, is disposed on the inner peripheral side of the second one-way clutch F2. The first one-way clutch F1 is non-engaged when rotation of the sleeve portion 13c is lower than that of the coupling member 63. The second one-way clutch F2 is non-engaged when rotation of the sleeve portion 62 is lower than that of the coupling member 63. Rotation of the internal combustion engine 2 is transferred to the sleeve portion 13c by the engine coupling shaft 13. Rotation of the rotor 4 of the motor 3 is transferred to the sleeve portion 62, and rotation of the internal combustion engine 2 is transferred to the sleeve portion 62 via the clutch K0. Therefore, rotation of one of the motor 3 and the internal combustion engine 2, the rotational speed of which is higher (not lower) than the other, is transferred to the coupling member 63 by the one-way clutches F1 and F2.

The clutch K0 is disposed on the radially outer side of the first one-way clutch F1 and the second one-way clutch F2. In particular, the first one-way clutch F1 and the second one-way clutch F2 are disposed on the radially inner side of the inner friction plates 17 and the outer friction plates 19, which are a plurality of friction plates, of the clutch K0 so as to overlap at least some of the plurality of friction plates as seen from the radial direction. In the case of the embodiment, in addition, the first one-way clutch F1 and the second one-way clutch F2 are disposed on the radially inner side of the hydraulic servo 40 so as to overlap at least a part of the hydraulic servo 40 as seen from the radial direction. In particular, the first one-way clutch F1 and the second one-way clutch F2 are disposed on the radially inner side of the cancellation oil chamber 47 so as to overlap at least a part of the cancellation oil chamber 47 as seen from the radial direction.

In addition, the sliding portion 43a, over which the piston 43 slides with respect to the hydraulic cylinder 42, is disposed on the radially outer side of the first one-way clutch F1 and the second one-way clutch F2 so as to overlap at least a part of the first one-way clutch F1 and the second one-way clutch F2 as seen from the radial direction. As discussed above, the sliding portion 43a is the outer peripheral surface of the inner cylindrical portion 44c of the return portion 44, and is disposed such that the inner cylindrical portion 44c overlaps at least a part of the first one-way clutch F1 and the second one-way clutch F2 as seen from the radial direction.

In the case of the embodiment, in addition, the clutch K0, the first one-way clutch F1, and the second one-way clutch F2 are disposed in a space surrounded by the support portion 51a and the interposing portion 51b of the rotor hub 51, the damper 16, and the circular plate portion 61. In the embodiment, in particular, the partition wall 27 which is a case wall, the support portion 51a of the rotor hub 51, the clutch K0, and the damper 16 are disposed in this order from the internal combustion engine 2 side in the axial direction of the motor 3. Therefore, the degree of freedom in installation of the damper 16 can be enhanced without the damper 16 being affected by the partition wall 27. In the case of the embodiment, the motor 3 is oil-cooled as discussed later. Therefore, it is not necessary to provide a partition wall between the motor 3 and the clutch K0 as in the structure described in Patent Document 1 discussed earlier, and it is possible to easily achieve a structure in which the partition wall 27, the support portion 51*a*, the clutch K0, and the damper 16 are disposed in this order in the axial direction of the motor 3 as discussed above.

In addition, if the degree of freedom in installation of the damper 16 is enhanced, it is easy to increase the radial dimension of the damper 16 while suppressing the axial dimension of the device, which makes it easy to secure the stroke amount of the damper 16 to enhance the vibration suppression performance of the damper 16. In the case of the embodiment, in particular, as illustrated in FIG. 1, the motor 3 is connected to an end portion of the input shaft 15 of the speed change mechanism 7. With such a configuration, resonance is occasionally caused depending on the rotational speed. For example, resonance may be caused at 2500 rpm. Therefore, such resonance can be suppressed by providing the damper 16 between the motor 3 and the speed change mechanism 7 and increasing the radial dimension of the damper 16.

In the case of the embodiment, the damper 16 is provided between the motor 3 and the speed change mechanism 7 in addition to the damper 12 which is provided between the internal combustion engine 2 and the input portion 9. Vibration of the internal combustion engine 2 is absorbed by the two dampers 12 and 16. In the case where a single damper that absorbs vibration of the internal combustion engine 2 is provided, all the vibration may not be absorbed, and a muffled sound may be generated. In this case, it is conceivable to absorb the vibration by causing the clutch K0 to slip. However, causing the clutch K0 to slip in this way may degrade the fuel efficiency. Thus, in the embodiment, two dampers 12 and 16 are disposed, and the radial dimension of the damper 16 is increased to reduce the amount of slip, or even eliminate the slip, of the clutch K0, which makes it possible to absorb vibration of the internal combustion engine 2 while improving the fuel efficiency.

In addition, the damper 16 is disposed such that at least a part of the damper 16 overlaps the coil end 5*b* of the stator 5 as seen from the radial direction of the motor 3. Therefore, the axial dimension of the device can be further suppressed. In particular, the damper shell 160 of the damper 16 can be connected to the clutch drum 50 on the radially inner side with respect to the rivets 168 which join the pair of shell members 160*a* and 160*b* to each other. Therefore, the radial dimension of the clutch-side engagement portions 50*c* of the clutch drum 50 can be suppressed to reduce the size of the device. In addition, the clutch-side engagement portions 50*c* are positioned on the radially outer side with respect to the spline portion 50*a*, at which the clutch drum 50 engages the rotor hub 51. Therefore, the damper 16 can be brought closer to the rotor 4 in the axial direction to reduce the size of the device.

In addition, a through hole 61*a* is formed in the circular plate portion 61 at a plurality of locations in the circumferential direction. In each through hole 61*a*, the pinion (first rotation transfer member) 64 is rotatably supported by a needle bearing (bearing) 65. Thus, the pinion 64 is disposed so as to penetrate the circular plate portion 61. The pinion 64 has a shaft portion 64*a* rotatably supported by the needle bearing 65. Gears 66*a* and 66*b* are respectively fixed to both end portions of the shaft portion 64*a*. That is, the pinion 64 includes the shaft portion 64*a*, the gear (first gear) 66*a* which is formed at one end portion of the shaft portion 64*a*, and the gear (second gear) 66*a* which is formed at the other end portion of the shaft portion 64*a*. In the embodiment, the shaft portion 64*a* and the gears 66*a* and 66*b* are constituted by integrating separate members. However, the present embodiment is not limited thereto. For example, at least one of the gears 66*a* and 66*b* and the shaft portion 64*a* may be integrally formed as a single member.

A gear (fourth gear) 63*a* formed on the outer peripheral surface of an end portion of the coupling member 63 is meshed with the gear 66*a* on the coupling member 63 side with respect to the circular plate portion 61 from the inner peripheral side. A gear (third gear) 71*a* formed on a sprocket 71 configured to transfer rotation to the oil pump 80 to be discussed next is meshed with the gear 66*b* on the speed change mechanism 7 side, which is opposite to the coupling member 63 with respect to the circular plate portion 61, from the inner peripheral side. That is, the plurality of pinions 64 are disposed as meshed with the respective outer peripheries of the single gear 71*a* and the single gear 63*a*. Consequently, rotation of the coupling member 63 is transferred to the sprocket 71 via the gears 63*a* and 66*a*, the pinions 64 (shaft portions 64*a*), and the gears 66*b* and 71*a*. As a result, rotation can be transferred from the coupling member 63 to the oil pump 80 even in a structure in which the oil pump 80 is disposed on the side opposite to the coupling member 63 with respect to the circular plate portion 61. In addition, the pinions 64 and the carrier 60 are rotated together with each other in the case where the oil pump 80 is driven by the motor 3 with the clutch K0 in the slip state or the disengaged state.

Subsequently, the oil pump 80 (see FIG. 1) will be described. The oil pump 80 is disposed on a transfer shaft (drive shaft) 81 on the speed change mechanism 7 side with respect to the motor 3, and disposed at the outer periphery of the transmission case. The transfer shaft 81 is separate from the input shaft 15 of the speed change mechanism 7, which is a first shaft member that is drivably coupled to the internal combustion engine 2 via the clutch K0 and the damper 16, and disposed in parallel with the input shaft 15. That is, the oil pump 80 is provided to the speed change mechanism 7. The oil pump 80 is rotationally driven when the transfer shaft 81 is rotated. Rotation of the pinions 64 is transferred to the transfer shaft 81 by a rotation transfer mechanism 70.

The rotation transfer mechanism 70 has the sprocket 71, a sprocket 72, and a chain 73 meshed with the sprockets 71 and 72. Rotation of the sprocket 71 is transferred to the sprocket 72 via the chain 73. The sprocket 71 is rotatably supported on the outer peripheral surface of the sleeve member 25 by a ball bearing 74. As discussed above, rotation of the coupling member 63 is transferred to the sprocket 71 via the pinions 64 etc. The sprocket 72 is fixed to the transfer shaft 81. The transfer shaft 81 is rotated together with the sprocket 72.

The sprockets 71 and 72 and the chain 73 are disposed adjacent to the speed change mechanism 7 side of the damper 16 and the circular plate portion 61. In particular, the center portion of the chain 73 between the sprockets 71 and 72, at which the chain 73 is vibrated significantly, is adjacent to the damper 16. In the embodiment, as discussed above, the damper 16 is disposed as offset to the coupling member 63 side with respect to the circular plate portion 61. Therefore, the portion of the chain 73 at which the chain 73 is vibrated significantly and the damper 16 can be disposed with a clearance provided therebetween so as not interfere with each other. Such a clearance can be secured without moving the rotation transfer mechanism 70 to the speed change mechanism 7 side. Therefore, an increase in size of the device can be suppressed.

The transfer shaft 81 is rotatably supported by the housing case 26, and transfers rotation to the oil pump 80. The oil pump 80 is a so-called internal gear pump, and is configured to have: a drive gear drivably coupled to the transfer shaft 81; a driven gear disposed as meshed with the outer periphery of the drive gear, a pump body that covers the drive gear and the driven gear from the outer peripheral side; and a pump cover that closes the pump body.

In the case of the embodiment thus configured, the first one-way clutch F1 is non-engaged when rotation of the engine coupling shaft 13 (that is, the internal combustion engine 2) is lower than rotation of the coupling member 63, and engaged when rotation of the engine coupling shaft 13 is equal to rotation of the coupling member 63 so that the oil pump 80 is drivably coupled to the internal combustion engine 2 via the pinions 64 and the rotation transfer mechanism 70 to be driven by the drive force of the internal combustion engine 2. In addition, the second one-way clutch F2 is non-engaged when rotation of the rotor hub 51 (that is, the motor 3) is lower than rotation of the coupling member 63, and engaged when rotation of the rotor hub 51 is equal to rotation of the coupling member 63 so that the oil pump 80 is drivably coupled to the motor 3 via the pinions 64 and the rotation transfer mechanism 70 to be driven by the drive force of the motor 3. That is, the oil pump 80 can be drivably coupled to one of the engine coupling shaft 13 (that is, the internal combustion engine 2) and the rotor hub 51 (motor 3), the rotational speed of which is higher than the other, via the first one-way clutch F1 and the second one-way clutch F2.

Such an oil pump 80 is disposed so as to be drivably coupled to the transfer path $L_1$ on the internal combustion engine 2 side with respect to the clutch K0, and also disposed so as to be drivably coupled to the transfer path $L_2$ on the speed change mechanism 7 side with respect to the clutch K0 (see FIG. 1). In the case where the clutch K0 is engaged, in addition, the transfer path $L_1$ and the transfer path $L_2$ are drivably coupled to each other. Therefore, the internal combustion engine 2 and the motor 3 are rotated at the same rotational speed, and the oil pump 80 is driven by rotation of the internal combustion engine 2 and the motor 3.

The oil pump 80, which is drivably coupled to the engine coupling shaft 13 via the first one-way clutch F1 or drivably coupled to the rotor hub 51 via the second one-way clutch F2 in this way, is driven by the drive force of the motor 3 during EV travel, or by the inertial force of the vehicle via the speed change mechanism 7 in the coast state (with engine brake in operation), and driven by the drive force of the motor 3 and the internal combustion engine 2 during hybrid travel, or by the inertial force of the vehicle via the speed change mechanism 7 in the coast state (with engine brake in operation).

When the vehicle is started using the drive force of the internal combustion engine 2 with the clutch K0 in slip engagement from a state in which the vehicle is stationary, the first one-way clutch F1 is engaged before engagement of the clutch K0 (that is, the vehicle is stationary), and therefore the oil pump 80 is driven by the drive force of the internal combustion engine 2.

When the oil pump 80 is driven in this way, a hydraulic pressure is generated and supplied to the hydraulic control device 21 through an oil passage formed in the partition wall 27 etc. even when the vehicle is stationary. Thus, when the vehicle is started using the drive force of the internal combustion engine 2, not only a hydraulic pressure from an electric oil pump (not illustrated) but also a hydraulic pressure from the oil pump 80 is applied. Therefore, a lubrication pressure for supplying lubricating oil, which is required in a large amount for slip engagement at the time when the vehicle is started, can be generated not only from the electric oil pump but also from the oil pump 80.

Next, the structure of various oil passages in the input portion 9 will be described. As illustrated in FIG. 3, an engagement pressure for the clutch K0 is supplied from the hydraulic control device 21 through an oil passage a11 formed in the input shaft 15 to extend in the axial direction via a portion (not illustrated) on the basis of a command from the control section 20. The oil passage a11 is closed at an end portion of the input shaft 15 on the internal combustion engine 2 side. The oil passage a11 communicates with an oil passage a13 in the flange portion 13a via an oil passage a12 formed to extend in the radial direction to penetrate the input shaft 15. The oil passage a13 communicates with the hydraulic oil chamber 46 of the hydraulic servo 40. When the engagement pressure is supplied to the hydraulic oil chamber 46 via the oil passages a11 to a13, the piston 43 is moved forward in the axial direction against the urging force of the return spring 45 to engage the inner friction plates 17 and the outer friction plates 19 with each other. Consequently, the internal combustion engine 2 and the speed change mechanism 7 are drivably coupled to each other, and the vehicle 100 is brought into a hybrid travel state in which the vehicle may travel using the drive force of the internal combustion engine 2 and the motor 3.

When the engagement pressure is discharged (drained) from the hydraulic oil chamber 46 by the hydraulic control device 21 on the basis of a command from the control section 20, on the contrary, the piston 43 is moved rearward in the axial direction on the basis of the urging force of the return spring 45 to disengage the inner friction plates 17 and the outer friction plates 19 from each other. Consequently, the internal combustion engine 2 and the speed change mechanism 7 are decoupled from each other, and the vehicle 100 is brought into an EV travel state in which the vehicle may travel using only the drive force of the motor 3.

Meanwhile, lubricating oil for lubricating the clutch K0 is supplied via an oil passage a21 that is formed in the input shaft 15 to extend in the axial direction and that is different from the oil passage a11 discussed above. The oil passage a21 communicates with an oil passage a23 in the sleeve portion 13c via an oil passage a22 formed to extend in the radial direction to penetrate the input shaft 15 and a space in which the thrust bearing b3 is present. As discussed earlier, the oil passage a40 is formed between the return portion 44 and the hydraulic cylinder 42 and the clutch hub 49, and the oil passage a23 communicates with the oil passage a40. Thus, lubricating oil scattered from the oil passage a22 is led to the oil passage a40 via the oil passage 23a while lubricating the thrust bearing b3, and supplied from a plurality of through holes 49d formed in the drum portion 49a of the clutch hub 49 to the plurality of inner friction plates 17 and outer friction plates 19.

An oil passage a41 that allows communication between the oil passage a40 and the cancellation oil chamber 47 is formed in a part of the inner cylindrical portion 44c. Therefore, lubricating oil supplied via the oil passages a21 to a23 as discussed above is also led to the cancellation oil chamber 47.

The oil passages a21 to a23 are lubricating oil paths through which oil is supplied from the radially inner side of the clutch K0 to the clutch K0, that is, lubricating oil is scattered from the inner side toward the outer side, in the radial direction, of the inner friction plates 17 and the outer friction plates 19 to lubricate the inner friction plates 17 and the outer friction plates 19. The lubricating oil which has flowed from the through holes 49d of the clutch hub 49 passes through a space between the inner friction plates 17 and the outer friction plates 19 to lubricate and cool the inner friction plates 17 and the outer friction plates 19, and is collected by an oil pan (not illustrated). That is, the clutch K0 is a wet multi-plate clutch in which the inner friction plates 17 and the outer friction plates 19 are not in an oil-tight state (are in a non-oil-tight state) but are open to the atmosphere in the housing case 26 so that the inner friction plates 17 and the outer friction plates 19 are disposed in the air.

In addition, a part of lubricating oil scattered from the oil passage a22 is led to the needle bearing b22, the first one-way clutch F1, and the needle bearing b21, the needle bearing b24, the second one-way clutch F2, and the needle bearing b23, and further the thrust bearing b4, and lubricates such components.

In addition, lubricating oil for lubricating the motor 3 is supplied to an oil passage a31 formed in the input shaft 15 to extend in the axial direction in parallel with the oil passage a21. The oil passage a31 is open at an end portion of the input shaft 15 on the internal combustion engine 2 side, and the lubricating oil is discharged to the inner peripheral side of the tubular portion 51d via an oil passage a32 in the engine coupling shaft 13 and an oil passage a33 formed to extend in the radiation direction from the oil passage a32. Lubricating oil discharged to the inner peripheral side of the tubular portion 51d is led to the angular ball bearing 90 to lubricate the angular ball bearing 90. The lubricating oil which has lubricated the angular ball bearing 90 in this way is led to the inner side of the rotor hub 51. The lubricating oil which has been led to the inner side of the rotor hub 51 passes through an oil passage a34 formed in the rotor hub 51 to cool the motor 3. That is, in the embodiment, the motor 3 is cooled by oil that lubricates components in the housing case 26.

In addition, a part of the lubricating oil which is discharged to the inner peripheral side of the tubular portion 51d is also led to the needle bearing b31 and the thrust bearing b2 to lubricate the needle bearing b31 and the thrust bearing b2. A seal ring 27b is provided between the partition wall 27 and the engine coupling shaft 13 to prevent the lubricating oil which is led as discussed above from leaking to the internal combustion engine 2 side of the partition wall 27.

With the drive device 1 described above, as seen from the radial direction of the motor 3, the second one-way clutch F2 is disposed so as to overlap at least a part of the first one-way clutch F1, and the first one-way clutch F1 and the second one-way clutch F2 are disposed so as to overlap at least some of the plurality of inner friction plates 17 and outer friction plates 19 of the clutch K0. Therefore, the axial dimension of the device can be suppressed with a structure that has the two one-way clutches F1 and F2.

In the case of the embodiment, in addition, the first one-way clutch F1 and the second one-way clutch F2 are disposed so as to overlap at least a part of the hydraulic servo 40 as seen from the radial direction of the motor 3. In particular, the first one-way clutch F1 and the second one-way clutch F2 are disposed so as to overlap at least a part of the cancellation oil chamber 47. Therefore, the axial dimension of the device can be further suppressed.

In the embodiment, in addition, the sliding portion 43a for the piston 43 is disposed on the radially outer side of the first one-way clutch F1 and the second one-way clutch F2. Therefore, the sliding portion 43a, which requires a certain length in the axial direction in order to secure the moving distance of the piston 43, can be disposed efficiently utilizing a space on the radially outer side of the first one-way clutch F1 and the second one-way clutch F2, which further suppresses the axial dimension of the device. In addition, the sliding portion 43a is disposed on the radially outer side of the sleeve portion 13c which constitutes the outer race of the first one-way clutch F1. Therefore, it is possible to reduce the number of components, and to dispose the sliding portion 43a efficiently utilizing a space on the radially outer side of the sleeve portion 13c, which further suppresses the axial dimension of the device.

In the embodiment, in particular, the sleeve portion 13c, which is an engine-side cylindrical portion, constitutes the first one-way clutch F1 and the outer race of the needle bearings b21 and b22. Therefore, the sleeve portion 13c has an axially long shape, and an axially long space is present on the radially outer side of the sleeve portion 13c. In the embodiment, the inner cylindrical portion 44c which has the sliding portion 43a is disposed on the radially outer side of the sleeve portion 13c. Therefore, by disposing the sliding portion 43a, which requires a certain length in the axial direction, on the radially outer side of the sleeve portion 13c, it is possible to secure the axial distance of the sliding portion 43a efficiently utilizing a space on the radially outer side of the sleeve portion 13c which is long in the axial direction.

In addition, the oil passage a40, through which lubricating oil is supplied to the plurality of inner friction plates 17 and outer friction plates 19, is formed between the return portion 44, which form the cancellation oil chamber 47, and the hydraulic cylinder 42 and the clutch hub 49. Therefore, the oil passage a40, through which lubricating oil is supplied to the plurality of inner friction plates 17 and outer friction plates 19, can be provided while suppressing the axial dimension of the device. That is, in the case where the oil passage is different from the path discussed above, the axial dimension of the device may be increased in order to form the path. In contrast, the axial dimension of the device can be suppressed by forming the oil passage a40 utilizing the clearance between the cancellation oil chamber 47 and the clutch hub 49 as in the embodiment.

In the embodiment, further, as discussed above, the oil pump 80 is disposed so as to be drivably coupled to the engine coupling shaft 13, which is drivably coupled to the internal combustion engine 2, via the first one-way clutch F1, the coupling member 63, the pinions 64, the rotation transfer mechanism 70, and the transfer shaft 81. Therefore, the oil pump 80 can be driven by the drive force of the internal combustion engine 2. For example, sufficient lubricating oil can be supplied to the inner friction plates 17 and the outer friction plates 19 of the clutch K0 when the vehicle is started using the drive force of the internal combustion engine 2 while engaging the clutch K0.

In the embodiment, a mechanism composed of sprockets and a chain is used as a rotation transfer mechanism that transfers drive from the engine coupling shaft 13 to the transfer shaft 81 of the oil pump 80. However, other mechanisms such as a mechanism composed of a plurality of gears and a mechanism composed of pulleys and a belt, for example, may also be used. In this case, the rotation output member is a gear, a pulley, etc. In the embodiment, further, the oil pump 80 is disposed on the transfer shaft 81 which is separate from the input shaft 15. However, the oil pump may be disposed coaxially with the input shaft 15. Also in this case, the oil pump can be disposed close to the damper 16 by offsetting the damper 16 to the coupling member 63 side with respect to the circular plate portion 61, which reduces the size of the device.

<Second Embodiment>

Figure 4:
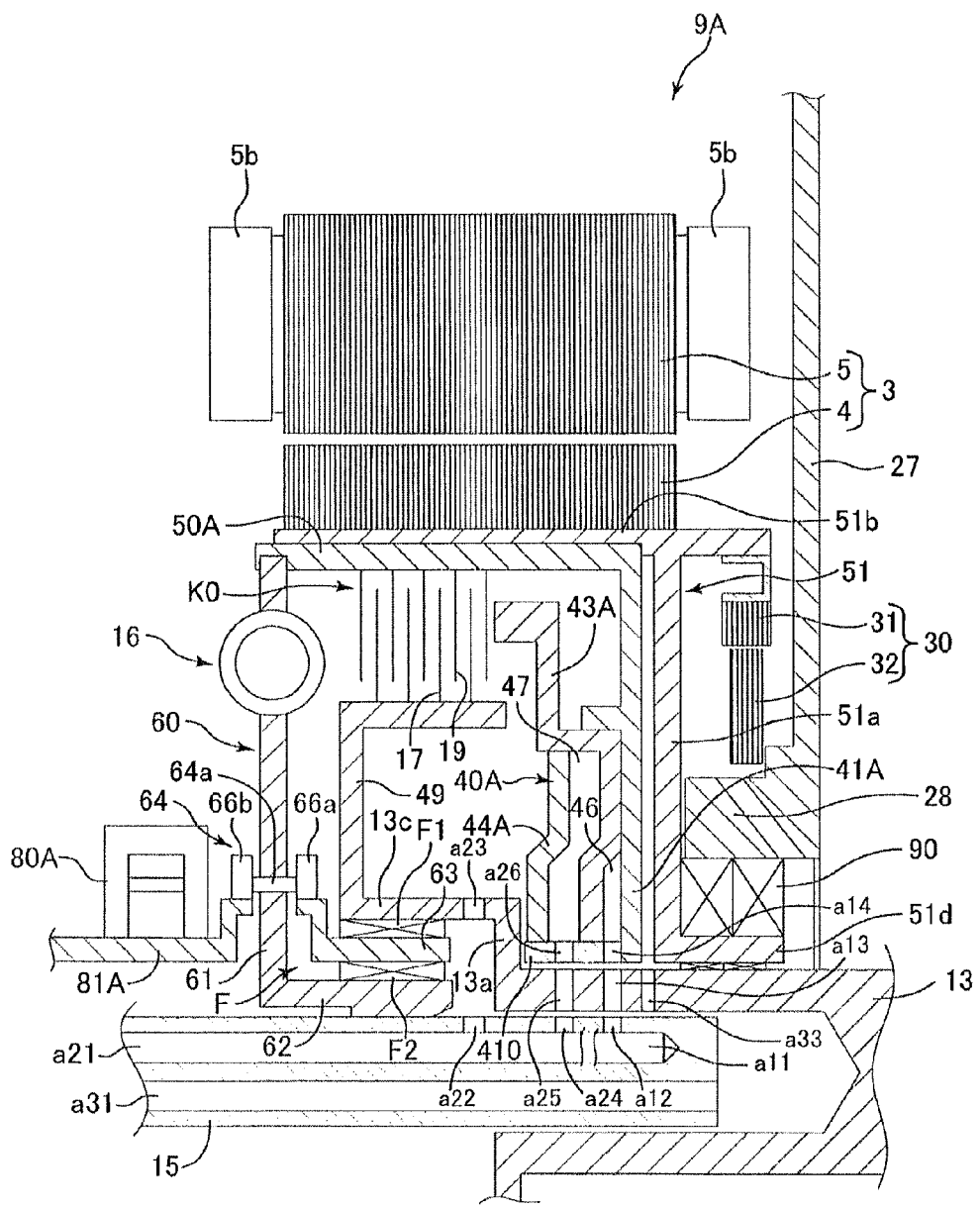
FIG. 4 is a sectional view schematically illustrating an input portion 9A according to a second embodiment.

The drive device 1 according to a second embodiment will be described with reference to FIG. 4. FIG. 4 is a sectional view schematically illustrating an input portion 9A according to the embodiment as partially omitted. The embodiment is different from the first embodiment discussed above in that a hydraulic servo 40A is disposed as displaced in the axial direction from the first one-way clutch F1 and the second one-way clutch F2, and that an oil pump 80A is disposed coaxially with the input shaft 15 of the speed change mechanism 7. The other components and functions of the embodiment are similar to those of the first embodiment. Therefore, similar components are given the same reference numerals to omit or simplify redundant description and mainly describe differences from the first embodiment below.

First, in the case of the embodiment, the hydraulic servo 40A is disposed as displaced in the axial direction from the first one-way clutch F1 and the second one-way clutch F2 to the internal combustion engine 2 (see FIG. 1) side. To this end, an end portion, on the internal combustion engine 2 side, of a clutch drum 50A rotatably connected to the rotor hub 51 and the damper 16 extends radially inward to be formed integrally with a cylinder portion 41A that constitutes a hydraulic cylinder. In addition, the radially inner end portion of the cylinder portion 41A further extends to the speed change mechanism 7 (see FIG. 1) side to form a cylindrical sleeve portion 410. The outer peripheral surface of the sleeve portion 410 serves as a sliding portion over which a piston 43A slides. A return portion (return plate) 44A is fixed to an end portion of the sleeve portion 410 so as to be positioned with respect to the cylinder portion 41A. In addition, a return spring (not illustrated) is disposed between the return portion 44A and the piston 43A. The hydraulic oil chamber 46 is formed between the cylinder portion 41A and the piston 43A. The cancellation oil chamber 47 is formed between the return portion 44A and the piston 43A.

In order to supply oil to each of the hydraulic oil chamber 46 and the cancellation oil chamber 47 which are formed as described above, oil passages are formed as follows. First, the oil passage a11 which is formed in the input shaft 15 to extend in the axial direction communicates with the oil passage a12 which is formed to extend in the radial direction to penetrate the input shaft 15, the oil passage a13 which is formed to penetrate the engine coupling shaft 13, and an oil passage a14 formed to penetrate the sleeve portion 410 and communicate with the hydraulic oil chamber 46. When the engagement pressure is supplied to the hydraulic oil chamber 46 via the oil passages a11 to a14, the piston 43A is moved forward in the axial direction against the urging force of the return spring to engage the inner friction plates 17 and the outer friction plates 19 with each other. Meanwhile, the oil passage a21 which is formed in the input shaft 15 to extend in the axial direction and which is different from the oil passage a11 discussed above communicates with an oil passage a24 formed to extend in the radial direction to penetrate the input shaft 15, an oil passage a25 formed to penetrate the engine coupling shaft 13, and an oil passage a26 formed to penetrate the sleeve portion 410 and communicate with the hydraulic oil chamber 47. Thus, oil is led to the cancellation oil chamber 47 via the oil passages a21 and a24 to a26.

Next, the oil pump 80A is disposed on a transfer shaft 81A on the speed change mechanism 7 side with respect to the motor 3. The transfer shaft 81A is disposed coaxially with the input shaft 15 of the speed change mechanism 7, which is a first shaft member drivably coupled to the internal combustion engine 2 via the clutch K0 and the damper 16. Rotation from the coupling member 63 is transferred to the transfer shaft 81A via the pinions 64 which are disposed so as to penetrate the circular plate portion 61.

Also in the case of such an embodiment, as seen from the radial direction of the motor 3, the second one-way clutch F2 is disposed so as to overlap at least a part of the first one-way clutch F1, and the first one-way clutch F1 and the second one-way clutch F2 are disposed so as to overlap at least some of the plurality of inner friction plates 17 and outer friction plates 19 of the clutch K0. Therefore, the axial dimension of the device can be suppressed with a structure that has the two one-way clutches F1 and F2.

In each of the embodiments discussed above, the oil pump 80, 80A is constituted as an internal gear pump. However, the present embodiment is not limited thereto. As a matter of course, the oil pump may have any structure. For example, a crescent internal gear pump, a vane pump, an external gear pump, etc. are also conceivable.

In each of the embodiments, in addition, an electric oil pump (not illustrated) is provided in addition to the oil pump 80. When the vehicle is stationary with the internal combustion engine 2 stopped (idle stop), however, a hydraulic pressure can be supplied to the hydraulic control device 21 by driving the oil pump 80 using the motor 3 and disengaging a clutch or a brake of the speed change mechanism 7 to establish a neutral state. Thus, the electric oil pump can be dispensed with.

In each of the embodiments, in addition, the bearings which are disposed in proximity to both ends of the first and second one-way clutches F1 and F2 are needle bearings. However, the present embodiment is not limited thereto. Any bearing such as ball bearings may also be used.

In each of the embodiments, in addition, the nut 92 is used as a member that fastens the angular ball bearing 90 to the rotor hub 51. However, any means that can fasten the angular ball bearing 90 and the rotor hub 51 to each other, such as a snap ring and caulking, may also be used.

In each of the embodiments, in addition, the angular ball bearing 90 is used as a rotor bearing that rotatably supports the tubular portion 51d of the rotor hub 51. However, the present embodiment is not limited thereto. A different type of bearing such as a tapered roller bearing, for example, may also be used. In this case, as a matter of course, a bearing that precisely supports the rotor 4 of the motor 3, even if the rotor 4 is not supported at two points, such as the angular ball bearing 90 is preferably used as the bearing.

In each of the embodiments, in addition, rotation of the clutch drum 50, 50A is transferred to the input shaft 15 via the damper 16. However, a configuration in which the damper 16 is omitted can also be applied to the drive device 1 according to the embodiment.

<Third Embodiment>

The drive device 1 according to a third embodiment will be described with reference to FIGS. 5 and 6. The embodiment is different from the first embodiment discussed above in that the damper 16 is omitted, that the rotor hub 51 is disposed on the speed change mechanism 7 side, rather than on the internal combustion engine 2 side, of 15 the clutch K0, and that not the damper 16 but the rotor hub 51 is supported by the carrier 60. The other components and functions of the embodiment are similar to those of the first embodiment. Therefore, similar components are given the same reference numerals to omit or simplify redundant description and mainly describe differences from the first embodiment below.

Figure 5:
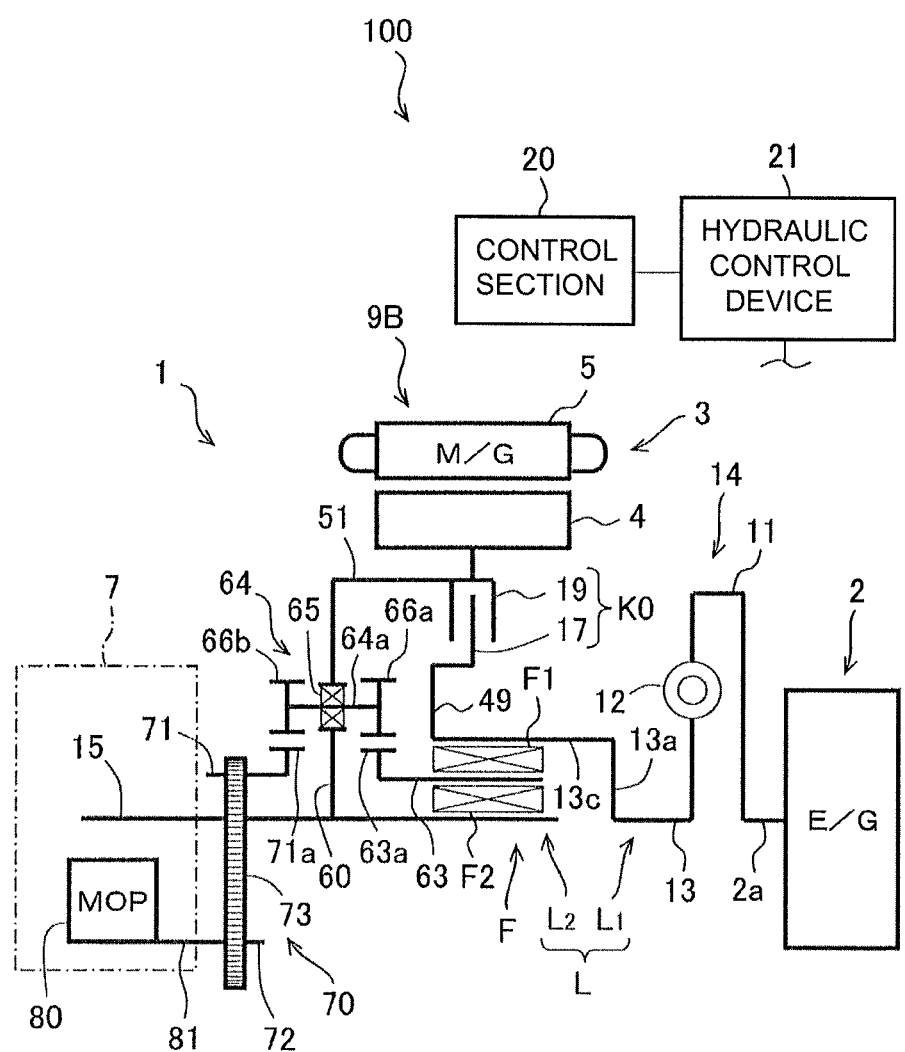
FIG. 5 is a schematic diagram illustrating a hybrid vehicle according to a third embodiment.
Figure 6:
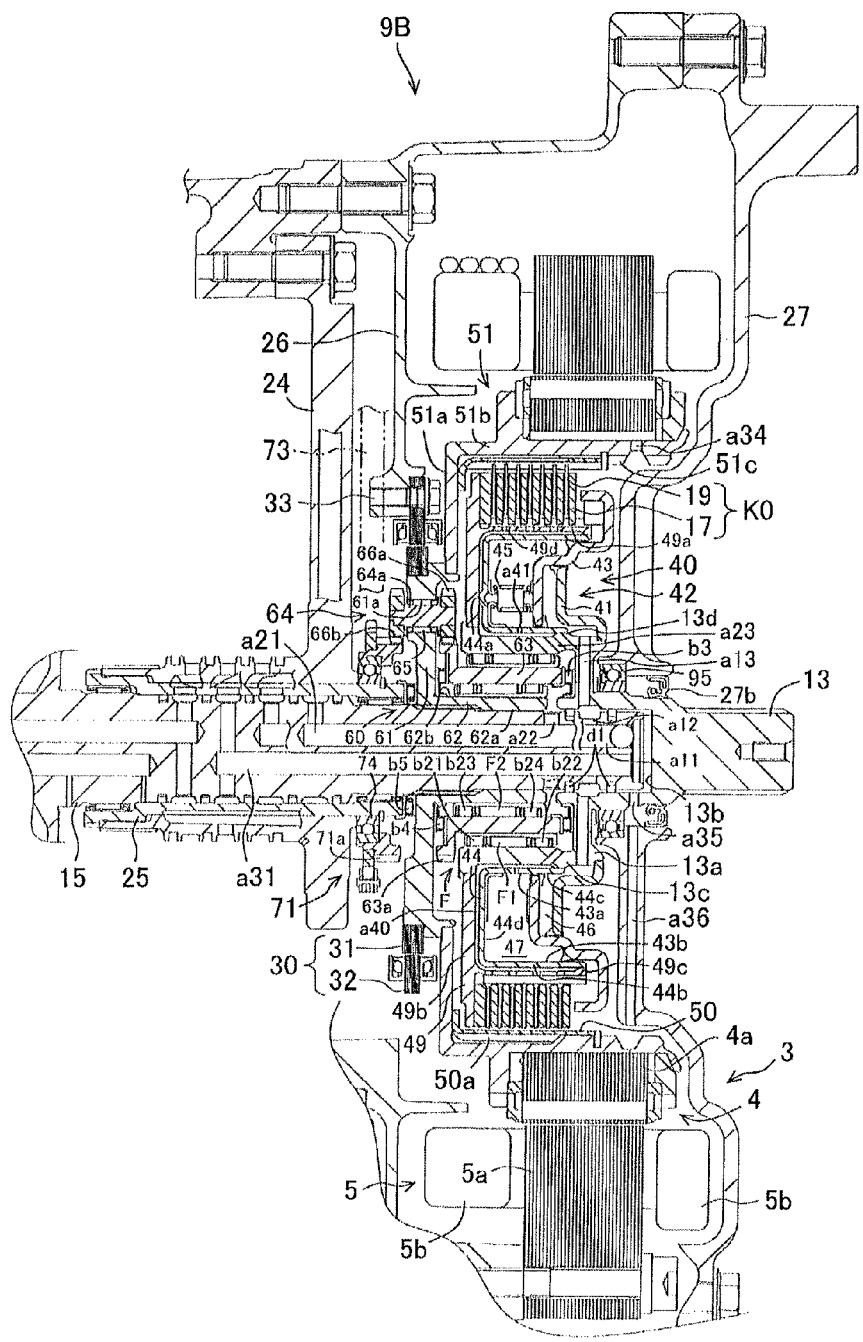
FIG. 6 is a sectional view illustrating an input portion 9B according to the third embodiment.

As illustrated in FIG. 5, the drive device 1 according to the embodiment is configured to have: the speed change mechanism 7 which is provided on the power transfer path L between the internal combustion engine 2 and the wheels; an input portion 9B which is disposed between the speed change mechanism 7 and the internal combustion engine 2 and to which power from the internal combustion engine 2 is input; and the connection portion 14 which connects between the input portion 9B and the internal combustion engine 2 while absorbing pulsations of the internal combustion engine 2. The internal combustion engine 2, the input portion 9B, and the speed change mechanism 7 are disposed coaxially in this order in the axial direction.

The input portion 9B is configured to include: the clutch K0 which enables and disables power transfer between (engages and disengages) the engine coupling shaft 13 and the input shaft 15 of the speed change mechanism 7; and the motor 3 which is drivably coupled to the clutch drum 50. The clutch K0 is constituted as a multi-plate clutch in which the inner friction plates 17 and the outer friction plates 19, which are a plurality of friction plates, are housed in the internal space of the clutch drum 50. The clutch drum 50 is drivably coupled to the input shaft 15 of the speed change mechanism 7 via the rotor hub 51 and the carrier 60. In the case of the embodiment, no damper is provided between the motor 3 and the speed change mechanism 7, and vibration of the internal combustion engine 2 is absorbed by the single damper 12. Therefore, the drive device 1 can be reduced in size and weight compared to a case where another damper is provided in addition to the damper 12.

Next, the configuration of the input portion 9B will be described in detail with reference to FIG. 6. The engine coupling shaft 13 is supported by a ball bearing 95 so as to be rotatable with respect to the partition wall 27. The input shaft 15 is rotatably supported with respect to the sleeve member 25 which is disposed on the inner peripheral side of the partition wall 24 which is fixed to the transmission case (not illustrated). The clutch K0 is disposed such that the partition wall 27, at least some of the outer friction plates 19 and the inner friction plates 17, and the rotor hub 51 are arranged in this order in the axial direction.

The clutch drum 50 is connected to the rotor hub 51, which holds the rotor 4, so as to enable rotation transfer. The spline portion 50a is formed on the outer peripheral surface of the clutch drum 50. The spline portion 50a is splined to the spline portion 51c which is formed on the inner peripheral surface of the drum-shaped interposing portion (rotor holding portion) 51b of the rotor hub 51 to be discussed later. The rotor hub 51 and the clutch drum 50 are connected to each other through the spline portions so as to enable rotation transfer. In addition, the plurality of outer friction plates 19 are splined to the inner side of the clutch drum 50. Thus, the outer friction plates 19 are drivably coupled to the input shaft 15 via the clutch drum 50, the rotor hub 51, and the carrier 60.

In the hydraulic servo 40, the cylinder portion 41 is joined to the outer peripheral surface of the flange portion 13a of the engine coupling shaft 13 by welding, bonding, or the like without using a seal ring, a snap ring, or the like, and positioned in the axial direction with respect to the flange portion 13a.

The rotor hub 51 which holds the rotor 4 is configured to have: the drum-shaped interposing portion 51b on which the rotor core 4a of the rotor 4 is held by caulking; and the flange-like support portion 51a which supports the interposing portion 51b. In addition, the rotor hub 51 is connected to the input shaft 15 by the carrier 60 so as to enable rotation transfer. The carrier 60 has the disk-like circular plate portion 61 which supports the rotor hub 51 on the radially inner side of the rotor hub 51, and the cylindrical sleeve portion 62 which is formed integrally with the circular plate portion 61 to extend in the axial direction from the inner peripheral edge portion of the circular plate portion 61. The rotor hub 51 is externally fitted on the outer peripheral surface of the circular plate portion 61. The inner peripheral portion of the support portion 51a is fixed to an end portion of the outer peripheral portion of the circular plate portion 61 that is offset to the coupling member 63 side by welding or the like.

In addition, the rotary element 31 is secured to an end portion of the outer peripheral portion of the circular plate portion 61 on the speed change mechanism 7 side. Meanwhile, the stationary element (detection coil) 32 is fixed to the housing case 26 by the bolt 33 so as to oppose the rotary element 31. The rotary element 31 and the stationary element 32 constitute the resolver 30 which detects the rotational state of the motor 3.

The sleeve portion 62 is splined to the input shaft 15. Therefore, the rotor 4 of the motor 3 is drivably coupled to the input shaft 15 of the speed change mechanism 7 via the rotor hub 51 and the carrier 60. In addition, the internal combustion engine 2 is drivably coupled to the input shaft 15 via the engine coupling shaft 13, the clutch K0, the rotor hub 51, and the carrier 60.

Next, the structure of various oil passages in the input portion 9B will be described for differences from that according to the first embodiment. Lubricating oil for lubricating the motor 3 is supplied to the oil passage a31 which is formed in the input shaft 15 to extend in the axial direction in parallel with the oil passage a21. The oil passage a31 is open at an end portion of the input shaft 15 on the internal combustion engine 2 side, and the lubricating oil is discharged to the outer peripheral side of the engine coupling shaft 13 via an oil passage a35 formed to extend in the radiation direction to open in the recessed portion 13b of the engine coupling shaft 13. A part of the lubricating oil discharged to the outer peripheral side of the engine coupling shaft 13 is led to the ball bearing 95 to lubricate the ball bearing 95. Another part of the lubricating oil discharged to the outer peripheral side of the engine coupling shaft 13 passes through an oil passage a36 formed in the partition wall 27, and further passes through the oil passage a34 which is formed in the rotor hub 51 to cool the motor 3. That is, in the embodiment, the motor 3 is cooled by oil that lubricates components in the housing case 26. The seal ring 27b is provided between the partition wall 27 and the engine coupling shaft 13 to prevent the lubricating oil which is led as discussed above from leaking to the internal combustion engine 2 side of the partition wall 27.

The dynamic load on the needle bearing 65 depends on the accumulated number of revolutions. Therefore, reducing the number of situations in which the pinions 64 are rotated can reduce the accumulated number of revolutions, and can reduce the dynamic load on the needle bearing 65. As a result, it is possible to reduce the number of rollers of the needle bearing 65 or the size of the rollers themselves compared to the related art. The respective rotational speeds of the internal combustion engine 2 and the motor 3 are different from each other, specifically: during EV travel in which the rotational speed of the motor 3 is higher than the rotational speed of the internal combustion engine 2; when the internal combustion engine 2 is started; when the vehicle is started by the internal combustion engine 2 with the rotational speed of the internal combustion engine 2 higher than the rotational speed of the motor 3; and when the internal combustion engine 2 is driven for warm-up with the vehicle stationary. The EV travel, which is more frequent and longer than the others, is focused on. It is desired to reduce the dynamic load which acts on the needle bearing 65 without rotating the pinions during EV travel.

In the drive device according to the related art, in the case where EV travel is performed using the rotary electric machine as a drive source with the starting clutch in the disengaged state, for example, the carrier is rotated by the rotary electric machine and the stepped planetary gear is not rotated by the internal combustion engine but stationary. Thus, the relative rotational speed at the bearing which supports the stepped planetary gear on the carrier may be increased. Therefore, the accumulated number of revolutions of the bearing may be increased to increase the dynamic load.

In the drive device 1 according to the first to third embodiments discussed above, in contrast, in the case where the oil pump 80, 80A is driven by the motor 3, rotation from the motor 3 is transferred to both the pinions 64 and the carrier 60. Therefore, a difference in rotation (relative rotation) is not caused between the pinions 64 and the carrier 60, the relative rotational speed is brought to 0, and the pinions 64 and the carrier 60 are rotated together with each other. Hence, the accumulated number of revolutions of the needle bearing 65 at a location at which power transfer paths intersect each other via the pinions 64 and the carrier 60 can be decreased for an amount corresponding to the absence of rotation of the pinions 64 relative to the carrier 60 compared to the technology in which the pinions are rotated relative to the carrier for an amount corresponding to a difference in rotation between the motor and the internal combustion engine with rotation of the motor transferred to the carrier and with rotation of the internal combustion engine transferred to the stepped planetary gear in the case where the oil pump 80, 80A is driven by the motor 3. Therefore, it is possible to reduce the dynamic load due to relative rotation between the pinions 64 and the carrier 60, and to reduce the number of rollers of the needle bearing or reduce the size of the rollers themselves compared to the related art.

In the drive device 1 according to the embodiment, in addition, the carrier 60 is disposed in a power transfer path from the motor 3 to the wheels. That is, the motor 3 is drivably coupled to the wheels via the rotor hub 51, the carrier 60, the input shaft 15, and the speed change mechanism 7. In the power transfer path, in addition, the second one-way clutch F2 is drivably coupled to a member on the wheels side with respect to the carrier 60, that is, the input shaft 15. That is, the motor 3 is drivably coupled to the second one-way clutch F2 via the carrier 60. Consequently, there is no need for a flange portion that projects in the radial direction and that couples the rotor hub 51 and the one-way clutches F1 and F2 to each other, which would be provided in the case where the motor 3 is drivably coupled to one of the one-way clutches F1 and F2 via only the rotor hub 51, for example. Thus, the size of the drive device 1 can be reduced.

In the drive device 1 according to the embodiment, in addition, the clutch K0 is disposed between the engine coupling shaft 13 and the carrier 60, that is, on the internal combustion engine 2 side with respect to the carrier 60, in the power transfer path. Consequently, the size of the drive device 1 can be reduced compared to a case where the clutch K0 is disposed at a different location.

With the drive device 1 according to the embodiment, in addition, as seen from the radial direction of the motor 3, the second one-way clutch F2 is disposed so as to overlap at least a part of the first one-way clutch F1, and the first one-way clutch F1 and the second one-way clutch F2 are disposed so as to overlap at least some of the plurality of inner friction plates 17 and outer friction plates 19 of the clutch K0. Therefore, the axial dimension of the device can be suppressed with a structure that has the two one-way clutches F1 and F2.

In the case of the embodiment, in addition, the first one-way clutch F1 and the second one-way clutch F2 are disposed so as to overlap at least a part of the hydraulic servo 40 as seen from the radial direction of the motor 3. In particular, the first one-way clutch F1 and the second one-way clutch F2 are disposed so as to overlap at least a part of the cancellation oil chamber 47. Therefore, the axial dimension of the device can be further suppressed.

In the embodiment, in addition, the sliding portion 43a for the piston 43 is disposed on the radially outer side of the first one-way clutch F1 and the second one-way clutch F2. Therefore, the sliding portion 43a, which requires a certain length in the axial direction in order to secure the moving distance of the piston 43, can be disposed efficiently utilizing a space on the radially outer side of the first one-way clutch F1 and the second one-way clutch F2, which further suppresses the axial dimension of the device. In addition, the sliding portion 43a is disposed on the radially outer side of the sleeve portion 13c which constitutes the outer race of the first one-way clutch F1. Therefore, it is possible to reduce the number of components, and to dispose the sliding portion 43a efficiently utilizing a space on the radially outer side of the sleeve portion 13c, which further suppresses the axial dimension of the device.

In the embodiment, in particular, the sleeve portion 13c, which is an engine-side cylindrical portion, constitutes the first one-way clutch F1 and the outer race of the needle bearings b21 and b22. Therefore, the sleeve portion 13c has an axially long shape, and an axially long space is present on the radially outer side of the sleeve portion 13c. In the embodiment, the inner cylindrical portion 44c which has the sliding portion 43a is disposed on the radially outer side of the sleeve portion 13c. Therefore, by disposing the sliding portion 43a, which requires a certain length in the axial direction, on the radially outer side of the sleeve portion 13c, it is possible to secure the axial distance of the sliding portion 43a efficiently utilizing a space on the radially outer side of the sleeve portion 13c which is long in the axial direction.

In addition, the oil passage a40, through which lubricating oil is supplied to the plurality of inner friction plates 17 and outer friction plates 19, is formed between the return portion 44, which form the cancellation oil chamber 47, and the hydraulic cylinder 42 and the clutch hub 49. Therefore, the oil passage a40, through which lubricating oil is supplied to the plurality of inner friction plates 17 and outer friction plates 19, can be provided while suppressing the axial dimension of the device. That is, in the case where the oil passage is different from the path discussed above, the axial dimension of the device may be increased in order to form the path. In contrast, the axial dimension of the device can be suppressed by forming the oil passage a40 utilizing the clearance between the cancellation oil chamber 47 and the clutch hub 49 as in the embodiment.

In the embodiment, further, as discussed above, the oil pump 80 is disposed so as to be drivably coupled to the engine coupling shaft 13, which is drivably coupled to the internal combustion engine 2, via the first one-way clutch F1, the coupling member 63, the pinions 64, the rotation transfer mechanism 70, and the transfer shaft 81. Therefore, the oil pump 80 can be driven by the drive force of the internal combustion engine 2. For example, sufficient lubricating oil can be supplied to the inner friction plates 17 and the outer friction plates 19 of the clutch K0 when the vehicle is started using the drive force of the internal combustion engine 2 while engaging the clutch K0.

In the embodiment, a mechanism composed of sprockets and a chain is used as a rotation transfer mechanism that transfers drive from the engine coupling shaft 13 to the transfer shaft 81 of the oil pump 80. However, other mechanisms such as a mechanism composed of a plurality of gears and a mechanism composed of pulleys and a belt, for example, may also be used. In this case, the rotation output member is a gear, a pulley, etc. In the embodiment, further, the oil pump 80 is disposed on the transfer shaft 81 which is separate from the input shaft 15. However, the oil pump may be disposed coaxially with the input shaft 15. Also in this case, the oil pump can be disposed close to the damper 16 by offsetting the damper 16 to the coupling member 63 side with respect to the circular plate portion 61, which reduces the size of the device.

<Fourth Embodiment>

Figure 7A:
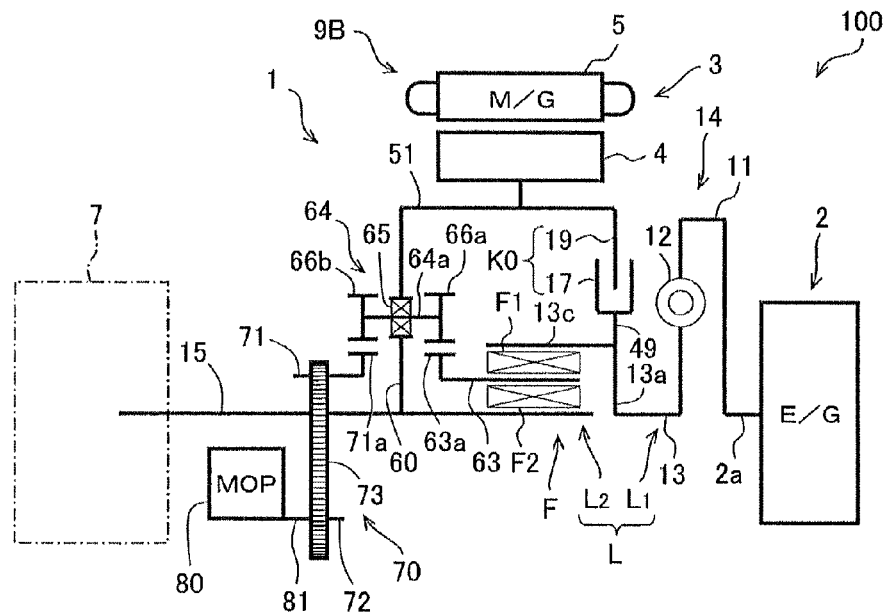
FIG. 7 is a schematic diagram illustrating a hybrid vehicle, in which FIG. 7A corresponds to a fourth embodiment and FIG. 7B corresponds to a fifth embodiment.

The drive device 1 according to a fourth embodiment will be described with reference to FIG. 7A. In the embodiment, the clutch hub 49 is attached to the outer peripheral portion of the flange portion 13*a* of the engine coupling shaft 13. The other components and functions of the embodiment are similar to those of the third embodiment. Therefore, similar components are given the same reference numerals to omit detailed description.

<Fifth Embodiment>

Figure 7B:
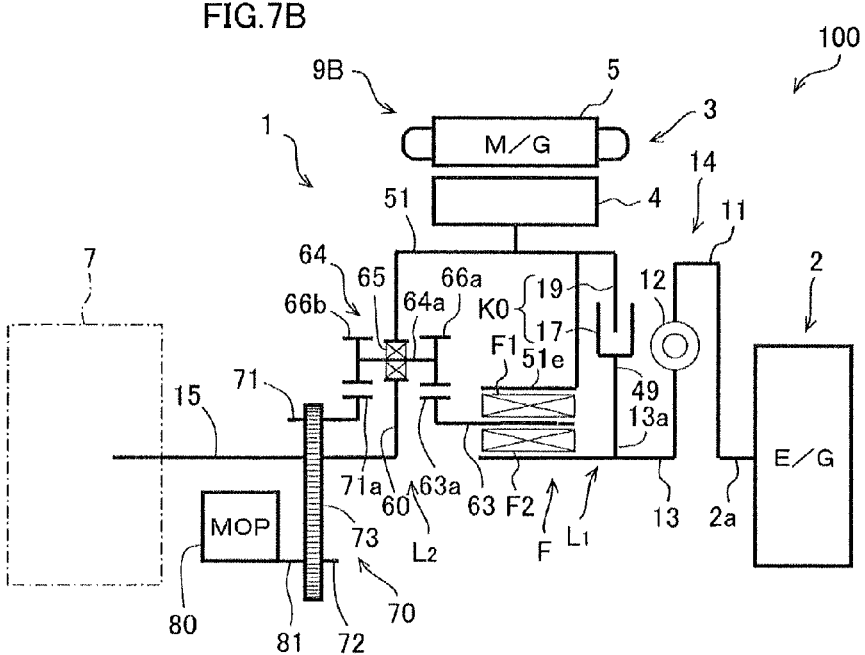

The drive device 1 according to a fifth embodiment will be described with reference to FIG. 7B. In the embodiment, the clutch hub 49 is attached to the outer peripheral portion of the flange portion 13*a* of the engine coupling shaft 13. In addition, the engine coupling shaft 13 does not have the sleeve portion 13*c*, and the second one-way clutch F2 is provided on the outer peripheral side of the engine coupling shaft 13. Further, the rotor hub 51 includes an inner cylindrical portion 51*e* that has an open end on the speed change mechanism 7 side. The inner cylindrical portion 51*e* is provided on the outer peripheral side of the first one-way clutch F1. The other components and functions of the embodiment are similar to those of the third embodiment. Therefore, similar components are given the same reference numerals to omit detailed description.

<Sixth Embodiment>

Figure 8A:
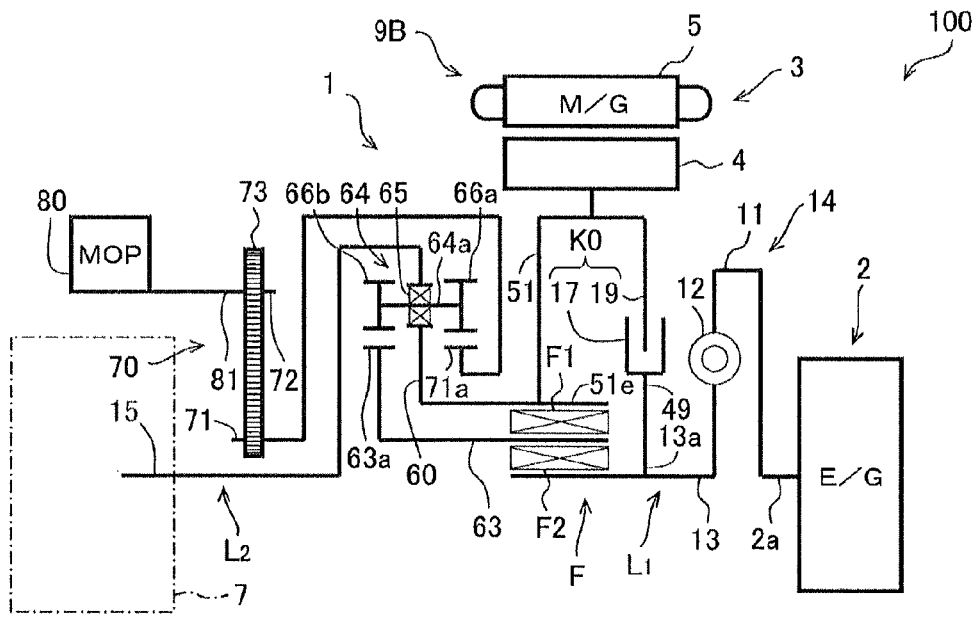
FIG. 8 is a schematic diagram illustrating a hybrid vehicle, in which FIG. 8A corresponds to a sixth embodiment and FIG. 8B corresponds to a seventh embodiment.

The drive device 1 according to a sixth embodiment will be described with reference to FIG. 8A. In the embodiment, the clutch hub 49 is attached to the outer peripheral portion of the flange portion 13*a* of the engine coupling shaft 13. In addition, the engine coupling shaft 13 does not have the sleeve portion 13*c*, and the second one-way clutch F2 is provided on the outer peripheral side of the engine coupling shaft 13. Further, the rotor hub 51 includes the inner cylindrical portion 51*e* which has an open end on the internal combustion engine 2 side. The inner cylindrical portion 51*e* is provided on the outer peripheral side of the first one-way clutch F1.

In addition, the rotor hub 51 is drivably coupled to the inner peripheral portion of the carrier 60, and the input shaft 15 is drivably coupled to the outer peripheral portion of the carrier 60. The coupling member 63 includes the gear (third gear) 63*a* which is meshed with the gear 66*b* from the inner peripheral side. The sprocket 71 is drivably coupled to the gear (fourth gear) 71*a* which is meshed with the gear 66*a* from the inner peripheral side. The other components and functions of the embodiment are similar to those of the third embodiment. Therefore, similar components are given the same reference numerals to omit detailed description.

<Seventh Embodiment>

Figure 8B:
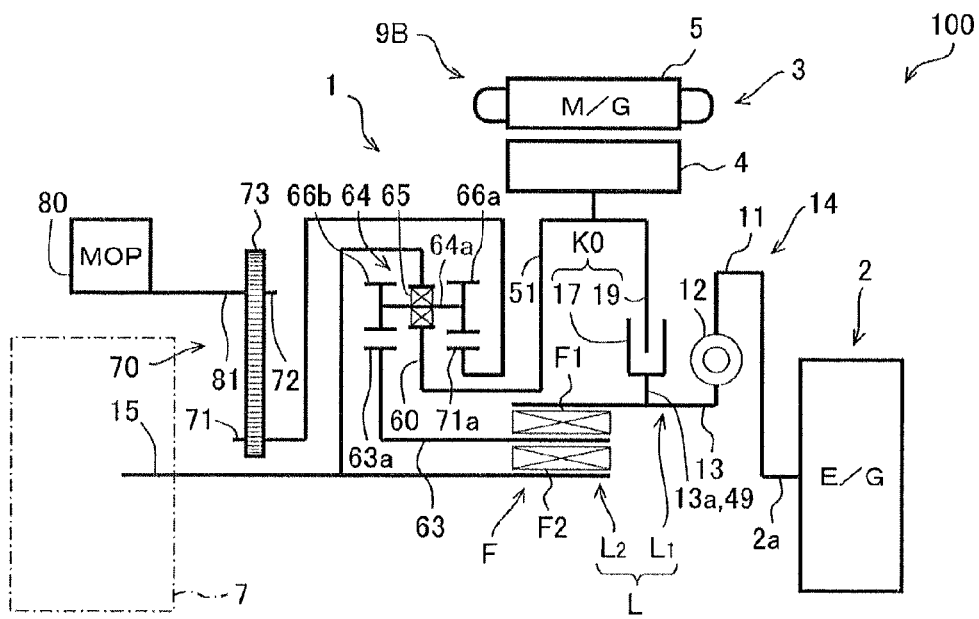

The drive device 1 according to a seventh embodiment will be described with reference to FIG. 8B. In the embodiment, the engine coupling shaft 13 has a cylindrical shape, and is provided on the outer peripheral side of the first one-way clutch F1. The clutch hub 49 is attached to the outer peripheral portion of the flange portion 13*a* of the engine coupling shaft 13. The rotor hub 51 is drivably coupled to the inner peripheral portion of the carrier 60, and the input shaft 15 is drivably coupled to the outer peripheral portion of the carrier 60. The coupling member 63 includes the gear (third gear) 63*a* which is meshed with the gear 66*b* from the inner peripheral side. The sprocket 71 is drivably coupled to the gear (fourth gear) 71*a* which is meshed with the gear 66*a* from the inner peripheral side. The other components and functions of the embodiment are similar to those of the third embodiment. Therefore, similar components are given the same reference numerals to omit detailed description.

<Eighth Embodiment>

Figure 9A:
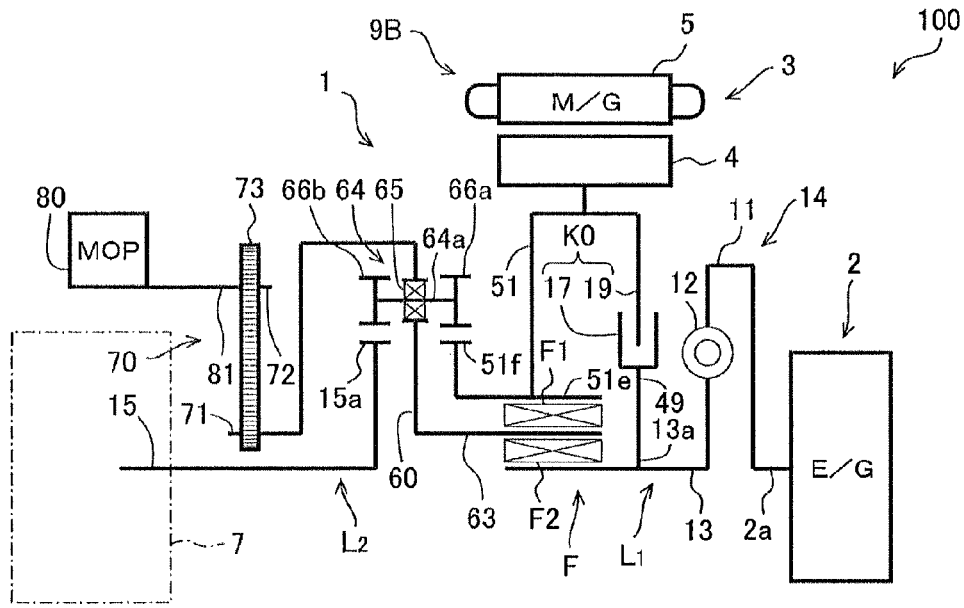
FIG. 9 is a schematic diagram illustrating a hybrid vehicle, in which FIG. 9A corresponds to an eighth embodiment and FIG. 9B corresponds to a ninth embodiment.

The drive device 1 according to an eighth embodiment will be described with reference to FIG. 9A. In the embodiment, the clutch hub 49 is attached to the outer peripheral portion of the flange portion 13*a* of the engine coupling shaft 13. In addition, the engine coupling shaft 13 does not have the sleeve portion 13*c*, and the second one-way clutch F2 is provided on the outer peripheral side of the engine coupling shaft 13. Further, the rotor hub 51 includes the inner cylindrical portion 51*e* which has an open end on the internal combustion engine 2 side. The inner cylindrical portion 51*e* is provided on the outer peripheral side of the first one-way clutch F1. In addition, the rotor hub 51 is drivably coupled to a gear (fourth gear) 51*f* meshed with the gear 66*a* from the inner peripheral side. The input shaft 15 is drivably coupled to the gear (third gear) 15*a* which is meshed with the gear 66*b* from the inner peripheral side. The coupling member 63 is drivably coupled to the inner peripheral portion of the carrier 60, and the sprocket 71 is drivably coupled to the outer peripheral portion of the carrier 60. In this case, unlike the first to seventh embodiments discussed above, the carrier 60 corresponds to the first rotation transfer member, and the pinions 64 correspond to the second rotation transfer member. The other components of the embodiment are similar to those of the third embodiment. Therefore, similar components are given the same reference numerals to omit detailed description.

In the embodiment, rotation of the motor 3 is transferred to the gear 66*a* of the pinions 64 via the rotor hub 51, and transferred from the gear 66*b* of the pinions 64 to the input shaft 15. In the embodiment, the pinions 64 are interposed in the power transfer path from the motor 3 to the input shaft 15, and the carrier 60 is interposed in the power transfer path from the one-way clutch portion F to the oil pump 80. Also in this case, in the case where the oil pump 80 is driven by the motor 3, rotation from the motor 3 is transferred to both the pinions 64 and the carrier 60. Therefore, a difference in rotation (relative rotation) is not caused between the pinions 64 and the carrier 60, and the pinions 64 and the carrier 60 are rotated together with each other. Thus, it is possible to reduce the dynamic load due to relative rotation between the pinions 64 and the carrier 60.

<Ninth Embodiment>

Figure 9B:
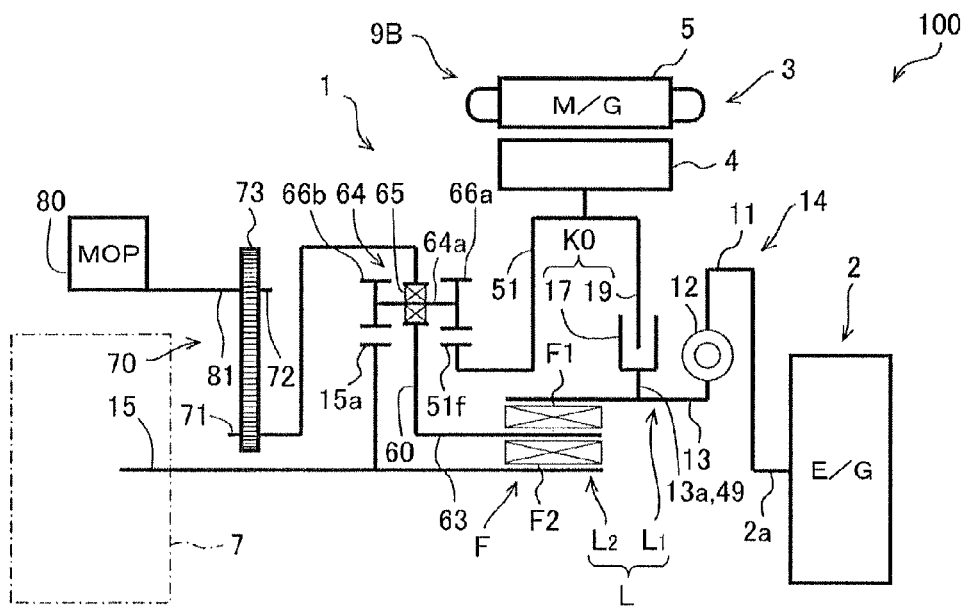

The drive device 1 according to a ninth embodiment will be described with reference to FIG. 9B. In the embodiment, the engine coupling shaft 13 has a cylindrical shape, and is provided on the outer peripheral side of the first one-way clutch F1. The clutch hub 49 is attached to the outer peripheral portion of the flange portion 13*a* of the engine coupling shaft 13. The rotor hub 51 is drivably coupled to the gear (fourth gear) 51*f* which is meshed with the gear 66*a* from the inner peripheral side. The input shaft 15 is drivably coupled to the gear (third gear) 15*a* which is meshed with the gear 66*b* from the inner peripheral side. The coupling member 63 is drivably coupled to the inner peripheral portion of the carrier 60, and the sprocket 71 is drivably coupled to the outer peripheral portion of the carrier 60. In this case, unlike the first to seventh embodiments discussed above, the carrier 60 corresponds to the first rotation transfer member, and the pinions 64 correspond to the second rotation transfer member. The other components of the embodiment are similar to those of the third embodiment. Therefore, similar components are given the same reference numerals to omit detailed description.

In the embodiment, rotation of the motor 3 is transferred to the gear 66*a* of the pinions 64 via the rotor hub 51, and transferred from the gear 66*b* of the pinions 64 to the input shaft 15. In the embodiment, as in the eighth embodiment, the pinions 64 are interposed in the power transfer path from the motor 3 to the input shaft 15, and the carrier 60 is interposed in the power transfer path from the one-way clutch portion F to the oil pump 80. Also in this case, in the case where the oil pump 80 is driven by the motor 3, rotation from the motor 3 is transferred to both the pinions 64 and the carrier 60. Therefore, a difference in rotation (relative rotation) is not caused between the pinions 64 and the carrier 60, and the pinions 64 and the carrier 60 are rotated together with each other. Thus, it is possible to reduce the dynamic load due to relative rotation between the pinions 64 and the carrier 60.

<Tenth Embodiment>

The drive device 1 according to a tenth embodiment will be described with reference to FIG. 10A. In the embodiment, the clutch hub 49 is attached to the outer peripheral portion of the flange portion 13*a* of the engine coupling shaft 13. In addition, the engine coupling shaft 13 does not have the sleeve portion 13*c*, and the second one-way clutch F2 is provided on the outer peripheral side of the engine coupling shaft 13. Further, the rotor hub 51 includes the inner cylindrical portion 51*e* which has an open end on the speed change mechanism 7 side. The inner cylindrical portion 51*e* is provided on the outer peripheral side of the first one-way clutch F1. In addition, the rotor hub 51 is drivably coupled to the gear (third gear) 51*f* which is meshed with the gear 66*b* from the inner peripheral side. The input shaft 15 is drivably coupled to the gear (fourth gear) 15*a* which is meshed with the gear 66*a* from the inner peripheral side. The coupling member 63 is drivably coupled to the outer peripheral portion of the carrier 60, and the sprocket 71 is drivably coupled to the inner peripheral portion of the carrier 60. In this case, unlike the first to seventh embodiments discussed above, the carrier 60 corresponds to the first rotation transfer member, and the pinions 64 correspond to the second rotation transfer member. The other components of the embodiment are similar to those of the third embodiment. Therefore, similar components are given the same reference numerals to omit detailed description.

In the embodiment, rotation of the motor 3 is transferred to the gear 66*b* of the pinions 64 via the rotor hub 51, and transferred from the gear 66*a* of the pinions 64 to the input shaft 15. In the embodiment, as in the eighth embodiment, the pinions 64 are interposed in the power transfer path from the motor 3 to the input shaft 15, and the carrier 60 is interposed in the power transfer path from the one-way clutch portion F to the oil pump 80. Also in this case, in the case where the oil pump 80 is driven by the motor 3, rotation from the motor 3 is transferred to both the pinions 64 and the carrier 60. Therefore, a difference in rotation (relative rotation) is not caused between the pinions 64 and the carrier 60, and the pinions 64 and the carrier 60 are rotated together with each other. Thus, it is possible to reduce the dynamic load due to relative rotation between the pinions 64 and the carrier 60.

<Eleventh Embodiment>

The drive device 1 according to an eleventh embodiment will be described with reference to FIG. 10B. In the embodiment, the engine coupling shaft 13 has a cylindrical shape, and is provided on the outer peripheral side of the first one-way clutch F1. The clutch hub 49 is attached to the outer peripheral portion of the flange portion 13*a* of the engine coupling shaft 13. The rotor hub 51 is drivably coupled to the gear (third gear) 71*a* which is meshed with the gear 66*b* from the inner peripheral side. The input shaft 15 is drivably coupled to the gear (fourth gear) 63*a* which is meshed with the gear 66*a* from the inner peripheral side. The coupling member 63 is drivably coupled to the outer peripheral portion of the carrier 60, and the sprocket 71 is drivably coupled to the inner peripheral portion of the carrier 60. In this case, unlike the first to seventh embodiments discussed above, the carrier 60 corresponds to the first rotation transfer member, and the pinions 64 correspond to the second rotation transfer member. The other components of the embodiment are similar to those of the third embodiment. Therefore, similar components are given the same reference numerals to omit detailed description.

In the embodiment, rotation of the motor 3 is transferred to the gear 66*b* of the pinions 64 via the rotor hub 51, and transferred from the gear 66*a* of the pinions 64 to the input shaft 15. In the embodiment, as in the eighth embodiment, the pinions 64 are interposed in the power transfer path from the motor 3 to the input shaft 15, and the carrier 60 is interposed in the power transfer path from the one-way clutch portion F to the oil pump 80. Also in this case, in the case where the oil pump 80 is driven by the motor 3, rotation from the motor 3 is transferred to both the pinions 64 and the carrier 60. Therefore, a difference in rotation (relative rotation) is not caused between the pinions 64 and the carrier 60, the relative rotational speed is brought to 0, and the pinions 64 and the carrier 60 are rotated together with each other. Thus, it is possible to reduce the dynamic load due to relative rotation between the pinions 64 and the carrier 60.

In the drive device 1 according to the first to eleventh embodiments discussed above, the first rotation transfer member has a state of being driven by the internal combustion engine 2 and a state of being driven by the motor 3. Consequently, the drive device 1 according to the first to eleventh embodiments discussed above can be applied to the hybrid vehicle 100 on which both the internal combustion engine 2 and the motor 3 are mounted.

In the drive device 1 according to the first to eleventh embodiments discussed above, in addition, the oil pump 80, 80A has a state of being driven by the internal combustion engine 2 via the first rotation transfer member and a state of being driven by the motor 3 via the first rotation transfer member. Consequently, the drive device 1 according to the first to eleventh embodiments discussed above can be applied to the hybrid vehicle 100 on which both the internal combustion engine 2 and the motor 3 are mounted.

In addition, the drive device 1 according to the first to eleventh embodiments discussed above includes the one-way clutch portion F which transfers rotation of one of the internal combustion engine 2 and the motor 3, the rotational speed of which is higher than the other, to the first rotation transfer member. Consequently, with the drive device 1 according to the first to eleventh embodiments discussed above, rotation of one of the internal combustion engine 2 and the motor 3, the rotational speed of which is higher than the other, is selectively transferred to the first rotation transfer member by the one-way clutch portion F, and thus a sufficient amount of oil to be discharged from the oil pump 80, 80A can be secured without interference between rotation of the internal combustion engine 2 and rotation of the motor 3.

In the drive device 1 according to the first to eleventh embodiments discussed above, in addition, the pinion 64 includes the shaft portion 64a, the gear 66a which is formed at one end portion of the shaft portion 64a, and the gear 66b which is formed at the other end portion of the shaft portion 64a, and the carrier 60 rotatably supports the shaft portion 64a via the needle bearing 65. Consequently, with the drive device 1 according to the first to eleventh embodiments discussed above, the pinions 64 penetrate the carrier 60, and thus the internal combustion engine 2 or the motor 3 and the oil pump 80, 80A, which are spatially separated by the carrier 60, can be drivably coupled to each other by the pinions 64.

In the drive device 1 according to the first to seventh embodiments discussed above, in addition, the first rotation transfer member is the pinions 64, the second rotation transfer member is the carrier 60, and the drive device 1 includes the gear 71a, 63a which is meshed with the gear 66b and which is always drivably coupled to the oil pump 80, 80A, and the gear 63a, 71a which is meshed with the gear 66a and which is drivably coupled to the one-way clutch portion F which transfers rotation of one of the internal combustion engine 2 and the motor 3, the rotational speed of which is higher than the other, to the pinions 64. Consequently, with the drive device 1 according to the first to seventh embodiments discussed above, rotation of one of the internal combustion engine 2 and the motor 3, the rotational speed of which is higher than the other, can be transferred to the oil pump 80, 80A by the pinions 64.

In the drive device 1 according to the first to fourth embodiments discussed above, in addition, the one-way clutch portion F includes: the first one-way clutch F1 which is non-engaged when the rotational speed on the internal combustion engine 2 side is lower than that of the gear 63a; and the second one-way clutch F2 which is non-engaged when the rotational speed of the motor 3 side is lower than that of the gear 63a. Consequently, with the drive device 1 according to the first to fourth embodiments discussed above, rotation of one of the internal combustion engine 2 and the motor 3, the rotational speed of which is higher than the other, can be selected using a simple configuration with two one-way clutches, and thus an increase in size of the drive device 1 can be suppressed.

In addition, the drive device 1 according to the first to eleventh embodiments discussed above includes the coupling member 63 which is coaxial with and coupled to the gear 63a, the first one-way clutch F1 is disposed on the outer peripheral side of the coupling member 63, and the second one-way clutch F2 is disposed on the inner peripheral side of the coupling member 63. Consequently, with the drive device 1 according to the first to eleventh embodiments discussed above, the second one-way clutch F2 can be disposed so as to overlap at least a part of the first one-way clutch F1 as seen from the radial direction of the motor 3, and thus the axial dimension of the drive device 1 can be suppressed compared to a case where the one-way clutches F1 and F2 are disposed side by side in the axial direction.

In the drive device 1 according to the first to eleventh embodiments discussed above, in addition, the pinions 64 and the carrier 60 are rotated relative to each other in the case where the oil pump 80, 80A is driven by the internal combustion engine 2.

In addition, the drive device 1 according to the first to eleventh embodiments discussed above includes the speed change mechanism 7 which has the input shaft 15 which is drivably coupled to the second rotation transfer member and which is provided with the oil pump 80, 80A, and the transfer shaft 81 of the oil pump 80, 80A is disposed on the outer peripheral side of the input shaft 15.

In addition, the drive device 1 according to the first to eleventh embodiments discussed above includes the clutch K0 which is capable of switching the state of coupling between the internal combustion engine 2 and the motor 3 between the engaged state and the disengaged state. Consequently, with the drive device 1 according to the first to eleventh embodiments discussed above, it is possible to achieve the hybrid vehicle 100 in which the internal combustion engine 2 and the motor 3 can be switchably used as drive sources.

In the drive device 1 according to the first to eleventh embodiments discussed above, the gear 63a, 71a, 15a, 51f is meshed with the gear 66a, 66b from the inner peripheral side. However, the present embodiment is not limited thereto. For example, as illustrated in FIG. 11A, the gear 63a, 71a may be formed as a ring gear to be meshed with the gear 66a, 66b from the outer peripheral side.

In the drive device 1 according to the first to eleventh embodiments discussed above, in addition, the oil pump 80, 80A is provided outside the speed change mechanism 7. However, the present embodiment is not limited thereto. For example, as illustrated in FIG. 11B, the oil pump 80 and the rotation transfer mechanism 70 may be housed inside a casing of the speed change mechanism 7.

In the drive device 1 according to the first to eleventh embodiments discussed above, in addition, the first one-way clutch F1 and the second one-way clutch F2 are disposed so as to at least partially overlap each other as seen from the radial direction. However, the present embodiment is not limited thereto. For example, as illustrated in FIG. 11C, the first one-way clutch F1 and the second one-way clutch F2 may be disposed side by side in the axial direction.

In the drive device 1 according to the first to eleventh embodiments discussed above, in addition, the pinions 64 rotatably support the carrier 60 through the needle bearing 65. However, the present embodiment is not limited thereto. For example, a sliding bearing may be used in place of the needle bearing 65, or the pinions 64 may be directly supported by the through holes 61a of the carrier 60 without providing any bearing.

In the drive device 1 according to the first and third to eleventh embodiments discussed above, in addition, the transfer shaft 81 of the oil pump 80 is provided non-coaxially with and in parallel with the input shaft 15. However, the present embodiment is not limited thereto. For example, the oil pump 80A which has the transfer shaft 81 which is coaxial with the input shaft 15 as described in relation to the second embodiment may be applied.

DESCRIPTION OF THE REFERENCE NUMERALS

1 DRIVE DEVICE
2 INTERNAL COMBUSTION ENGINE

3 MOTOR (ROTARY ELECTRIC MACHINE)
7 SPEED CHANGE MECHANISM
15 INPUT SHAFT
15a GEAR (THIRD GEAR, FOURTH GEAR)
51f GEAR (THIRD GEAR, FOURTH GEAR)
60 CARRIER (FIRST ROTATION TRANSFER MEMBER, SECOND ROTATION TRANSFER MEMBER)
63 COUPLING MEMBER (TUBULAR MEMBER)
63a GEAR (THIRD GEAR, FOURTH GEAR)
64 PINION (FIRST ROTATION TRANSFER MEMBER, SECOND ROTATION TRANSFER MEMBER)
64a SHAFT PORTION
65 NEEDLE BEARING (BEARING)
66a GEAR (SECOND GEAR)
66b GEAR (FIRST GEAR)
71a GEAR (THIRD GEAR, FOURTH GEAR)
80, 80A OIL PUMP
81 TRANSFER SHAFT (DRIVE SHAFT)
F ONE-WAY CLUTCH PORTION (ROTATION SELECTION PORTION)
F1 FIRST ONE-WAY CLUTCH
F2 SECOND ONE-WAY CLUTCH
K0 CLUTCH

The invention claimed is:

1. A drive device that has a rotary electric machine drivably coupled to wheels and a clutch that is capable of switching a state of coupling between an internal combustion engine and the rotary electric machine between an engaged state and a disengaged state, the drive device comprising:
an oil pump;
a first gear that is always drivably coupled to the oil pump;
a pinion meshed with the first gear;
a second gear meshed with the pinion and receives rotation of one of the internal combustion engine and the rotary electric machine, a rotational speed of the one of the internal combustion engine and the rotary electric: machine being higher than a rotational speed of an other of the internal combustion engine and the rotary electric machine, via a first one-way clutch or a second one-way clutch; and
a carrier drivably coupled to the wheels, driven by the rotary electric machine and rotatably supports the pinion.

2. The drive device according to claim 1, wherein
the pinion has a state of being driven by the internal combustion engine and a state of being driven by the rotary electric machine.

3. The drive device according to claim 2, wherein
the oil pump has a state of being driven by the internal combustion engine via the pinion and a state of being driven by the rotary electric machine via the pinion.

4. The drive device according to claim 1, wherein
the pinion includes a shaft portion, a third gear formed at one end portion of the shaft portion, and a fourth gear formed at an other end portion of the shaft portion; and
the carrier rotatably supports the shaft portion via a bearing.

5. The drive device according to claim 4, wherein
the first gear is meshed with the third gear; and
the second gear is meshed with the fourth gear and drivably coupled to the first one-way clutch or the second one-way clutch that transfers rotation of the one of the internal combustion engine and the rotary electric machine, the rotational speed of the one of the internal combustion engine and the rotary electric machine being higher than the rotational speed of the other of the internal combustion engine and the rotary electric machine, to the pinion.

6. The drive device according to claim 5, wherein
the first one-way clutch is non-engaged when the rotational speed of the internal combustion engine is lower than that of the second gear, and the second one-way clutch is non-engaged when the rotational speed of the rotary electric machine is lower than that of the second gear.

7. The drive device according to claim 6, further comprising:
a tubular member coaxially coupled to the second gear, wherein
the first one-way clutch is disposed on an outer peripheral side of the tubular member; and
the second one-way clutch is disposed on an inner peripheral side of the tubular member.

8. The drive device according to claim 1, wherein
the pinion and the carrier are rotated relative to each other when the oil pump is driven by the internal combustion engine.

9. The drive device according to claim 1, further comprising:
a speed change mechanism that has an input shaft drivably coupled to the carrier and provided with the oil pump, wherein
a drive shaft of the oil pump is disposed on an outer peripheral side of the input shaft.

10. A drive device that has a rotary electric machine drivably coupled to wheels and a clutch that is capable of switching a state of coupling between an internal combustion engine and the rotary electric machine between an engaged state and a disengaged state, the drive device comprising:
an oil pump;
a first gear drivably coupled to the wheels;
a pinion meshed with the first gear;
a second gear meshed with the pinion and drivably coupled to the rotary electric machine; and
a carrier that is always drivably coupled to the oil pump, rotatably supports the pinion, and receives rotation of one of the internal combustion engine and the rotary electric machine, a rotational speed of the one of the internal combustion engine and the rotary electric machine being higher than a rotational speed of an other of the internal combustion engine and the rotary electric machine, via a first one-way clutch or a second one-way clutch.

11. The drive device according to claim 10, further comprising:
a speed change mechanism that has an input shaft drivably coupled to the pinion and provided with the oil pump, wherein
a drive shaft of the oil pump is disposed on an outer peripheral side of the input shaft.

* * * * *